(12) United States Patent
Miller et al.

(10) Patent No.: US 12,676,931 B2
(45) Date of Patent: Jul. 7, 2026

(54) ARTIFICIAL INTELLIGENCE BASED SETTING OF CONTROLS IN A USER INTERFACE

(71) Applicant: Open Text Inc., Menlo Park, CA (US)

(72) Inventors: Donald Russ Miller, Josephine, TX (US); Saibal Das, Plano, TX (US)

(73) Assignee: OPEN TEXT INC., Menlo Park, CA (US)

( * ) Notice: Subject to any disclaimer, the term of this patent is extended or adjusted under 35 U.S.C. 154(b) by 145 days.

(21) Appl. No.: 18/394,201

(22) Filed: Dec. 22, 2023

(65) Prior Publication Data

US 2025/0211676 A1 Jun. 26, 2025

(51) Int. Cl.
*H04M 3/42* (2006.01)
*G06F 40/20* (2020.01)
*G06Q 30/01* (2023.01)

(52) U.S. Cl.
CPC ........ *H04M 3/42221* (2013.01); *G06F 40/20* (2020.01); *G06Q 30/01* (2013.01)

(58) Field of Classification Search
CPC ........... H04M 3/42221; H04M 3/5175; H04M 2203/401; H04M 2203/40; H04M 3/5233; H04M 2203/402; H04M 2203/403; G06F 40/20; G06F 40/295; G06F 40/205; G06F 16/3329; G06F 40/174; G06Q 30/01
See application file for complete search history.

(56) References Cited

U.S. PATENT DOCUMENTS

| | | | |
|---|---|---|---|
| 6,038,544 A | 3/2000 | Machin et al. | |
| 6,604,084 B1 | 8/2003 | Powers | |
| 6,606,744 B1 | 8/2003 | Mikurak | |
| 9,350,808 B2 | 5/2016 | Beck | |
| 9,742,914 B2 | 8/2017 | Surdick | |
| 10,496,705 B1 | 12/2019 | Irani | |

(Continued)

FOREIGN PATENT DOCUMENTS

CA 2845174 11/2014

OTHER PUBLICATIONS

Office Action for U.S. Appl. No. 18/464,890, mailed Jul. 31, 2024, 8 pgs.

(Continued)

*Primary Examiner* — Akelaw Teshale
(74) *Attorney, Agent, or Firm* — Sprinkle IP Law Group

(57) ABSTRACT

One embodiment comprises a system for artificial intelligence-based evaluation of an agent interaction. The system is operable to generate a transcript of the voice session recording of the call and parse the evaluation form to identify the evaluation question for an intended call participant interaction. The system is further operable to determine, using the machine learning model, that the intended call participant interaction of the evaluation question is present in the transcript. When the intended call participant interaction is present in the transcript, the system records a first answer for to the evaluation question corresponding to the voice session recording, the first answer indicating a presence of the intended call participant interaction in the voice session recording, and automatically sets the answer control in the visual display to indicate the presence of the intended call participant interaction in the voice session recording.

16 Claims, 15 Drawing Sheets

(56) References Cited

U.S. PATENT DOCUMENTS

| | | | | |
|---|---|---|---|---|
| 10,896,395 | B2 | 1/2021 | Lev-Tov | |
| 10,970,641 | B1 | 4/2021 | Flowers | |
| 11,057,519 | B1 | 7/2021 | Miller | |
| 11,687,537 | B2 | 6/2023 | Graff | |
| 11,805,204 | B2 | 10/2023 | Miller | |
| 11,941,649 | B2 | 3/2024 | Wood | |
| 12,113,934 | B1* | 10/2024 | Dempsey | H04M 3/5175 |
| 12,124,459 | B2 | 10/2024 | Graff | |
| 12,284,315 | B2 | 4/2025 | Miller | |
| 12,367,506 | B2 | 7/2025 | Wood | |
| 12,566,767 | B2 | 3/2026 | Graff | |
| 2001/0047261 | A1 | 11/2001 | Kassan | |
| 2001/0053977 | A1 | 12/2001 | Schaefer | |
| 2002/0062342 | A1 | 5/2002 | Sidles | |
| 2002/0111811 | A1 | 8/2002 | Bares | |
| 2002/0128898 | A1 | 9/2002 | Smith | |
| 2003/0105659 | A1 | 6/2003 | Eisenstein | |
| 2005/0198563 | A1 | 9/2005 | Kristjansson | |
| 2005/0257134 | A1 | 11/2005 | Goodman | |
| 2007/0233549 | A1 | 10/2007 | Watson | |
| 2008/0010351 | A1 | 1/2008 | Wardhaugh | |
| 2008/0086457 | A1 | 4/2008 | Fei | |
| 2008/0120257 | A1 | 5/2008 | Goyal | |
| 2008/0189171 | A1 | 8/2008 | Wasserblat | |
| 2008/0263023 | A1 | 10/2008 | Vailaya | |
| 2010/0161315 | A1 | 6/2010 | Melamed | |
| 2011/0055202 | A1 | 3/2011 | Heimendinger | |
| 2011/0206198 | A1 | 8/2011 | Freedman | |
| 2012/0084081 | A1 | 4/2012 | Melamed | |
| 2013/0108242 | A1 | 5/2013 | Oliver | |
| 2014/0046726 | A1 | 2/2014 | Brandt | |
| 2014/0122183 | A1 | 5/2014 | Niu | |
| 2014/0241519 | A1 | 8/2014 | Watson | |
| 2014/0272914 | A1 | 9/2014 | Baraniuk | |
| 2014/0288944 | A1 | 9/2014 | Miller | |
| 2015/0177964 | A1 | 6/2015 | Spirer | |
| 2015/0356578 | A1 | 12/2015 | Li | |
| 2016/0112565 | A1* | 4/2016 | Surdick | H04M 3/5175 |
| | | | | 379/265.06 |
| 2016/0119477 | A1 | 4/2016 | Sharpe | |
| 2016/0180360 | A1 | 6/2016 | Tietzen | |
| 2016/0189037 | A1 | 6/2016 | Pereg | |
| 2016/0196522 | A1 | 7/2016 | Niu | |
| 2016/0277577 | A1 | 9/2016 | Yentis | |
| 2017/0140467 | A1 | 5/2017 | Neag | |
| 2017/0257482 | A1 | 9/2017 | Chapman | |
| 2017/0300499 | A1* | 10/2017 | Lev-Tov | G06F 16/3329 |
| 2017/0364825 | A1 | 12/2017 | Tiell | |
| 2018/0091654 | A1* | 3/2018 | Miller | H04M 3/42221 |
| 2018/0096278 | A1* | 4/2018 | Lev-Tov | G06Q 10/06395 |
| 2018/0096617 | A1* | 4/2018 | Tapuhi | G06Q 10/0639 |
| 2019/0034060 | A1 | 1/2019 | Ahmad et al. | |
| 2019/0325464 | A1 | 10/2019 | Wood | |
| 2019/0325465 | A1 | 10/2019 | Newman | |
| 2019/0335038 | A1 | 10/2019 | Alonso Y Caloca | |
| 2019/0354598 | A1 | 11/2019 | Graff | |
| 2019/0362645 | A1* | 11/2019 | Miller | G06N 5/041 |
| 2021/0160373 | A1* | 5/2021 | Mcgann | G06Q 30/015 |
| 2021/0281683 | A1 | 9/2021 | Miller | |
| 2021/0287263 | A1* | 9/2021 | Alon | G06Q 30/0282 |
| 2023/0186225 | A1* | 6/2023 | Vepa | G06F 40/295 |
| | | | | 705/7.42 |
| 2023/0273930 | A1 | 8/2023 | Graff | |
| 2023/0421694 | A1 | 12/2023 | Miller | |
| 2024/0127274 | A1 | 4/2024 | Wood | |
| 2024/0193364 | A1* | 6/2024 | Morgan | G06F 40/253 |
| 2025/0036637 | A1 | 1/2025 | Graff | |
| 2025/0080648 | A1* | 3/2025 | Wilhelm | H04M 3/4365 |
| 2025/0080654 | A1* | 3/2025 | Kuppulal | H04M 3/5175 |
| 2025/0200491 | A1* | 6/2025 | Anwade | G06Q 30/015 |
| 2025/0220115 | A1 | 7/2025 | Miller | |
| 2025/0278688 | A1* | 9/2025 | Patil | G06Q 10/06398 |
| 2025/0315747 | A1* | 10/2025 | Dhawan | G06Q 10/06311 |
| 2025/0315853 | A1 | 10/2025 | Wood | |

OTHER PUBLICATIONS

Notice of Allowance for U.S. Appl. No. 18/314,583, mailed Jun. 7, 2024, 5 pgs.

Office Action for U.S. Appl. No. 15/990,279, mailed Jul. 5, 2024, 29 pgs.

Office Action for U.S. Appl. No. 18/397,978, mailed Sep. 23, 2024, 12 pgs.

Office Action for U.S. Appl. No. 18/828,853, mailed Jun. 16, 2025, 16 pgs.

Notice of Allowance for U.S. Appl. No. 18/464,890, mailed Dec. 11, 2024, 6 pgs.

Office Action for U.S. Appl. No. 15/990,279, mailed Jan. 2, 2025, 32 pgs.

OpenText™ Qfiniti User Guide, Version 16.3, Open Text Corporation, Waterloo, CA, Oct. 24, 2017, 634 pgs.

OpenText™, What's New in OpenText Qfiniti 16, Version 16.3, Open Text WFO Software, Addison, Texas, Oct. 25, 2017, 105 pgs.

Autonomy Qfiniti User Guide Version 3.5 SP2 Document Revision 3, Autonomy, Inc., San Francisco, CA, May 31, 2012, 590 pgs.

Office Action for U.S. Appl. No. 16/785,298, mailed Sep. 23, 2020, 12 pgs.

Office Action for U.S. Appl. No. 15/958,960, mailed Oct. 28, 2020, 18 pgs.

Office Action for U.S. Appl. No. 15/984,125, mailed Feb. 17, 2021, 18 pgs.

Office Action for U.S. Appl. No. 15/958,960, mailed May 24, 2021, 21 pgs.

Office Action for U.S. Appl. No. 15/984,125, mailed Aug. 31, 2021, 24 pgs.

Office Action for U.S. Appl. No. 14/958,960, mailed Oct. 4, 2021, 24 pgs.

Office Action for U.S. Appl. No. 15/990,279, mailed Jan. 5, 2022, 26 pgs.

Office Action for U.S. Appl. No. 15/984,125, mailed Feb. 1, 2022, 20 pgs.

Office Action for U.S. Appl. No. 17/329,405, mailed Feb. 3, 2022, 13 pgs.

Office Action for U.S. Appl. No. 15/958,960, mailed Apr. 1, 2022, 25 pgs.

Office Action for U.S. Appl. No. 15/990,279, mailed Jun. 9, 2022, 40 pgs.

Office Action for U.S. Appl. No. 15/984,125, mailed Aug. 15, 2022, 20 pgs.

Office Action for U.S. Appl. No. 15/958,960, mailed Aug. 31, 2022, 25 pgs.

Office Action for U.S. Appl. No. 15/990,279, mailed Dec. 22, 2022, 26 pgs.

Office Action for U.S. Appl. No. 15/958,960, mailed Dec. 23, 2022, 16 pgs.

Office Action for U.S. Appl. No. 15/958,960, mailed Apr. 12, 2023, 17 pgs.

Office Action for U.S. Appl. No. 15/990,279, mailed May 24, 2023, 26 pgs.

Office Action for U.S. Appl. No. 15/990,279, mailed Oct. 4, 2023, 22 pgs.

Office Action for U.S. Appl. No. 18/314,583, mailed Nov. 22, 2023, 26 pgs.

Office Action for U.S. Appl. No. 15/990,279, mailed Feb. 15, 2024, 18 pgs.

Supplemental Notice of Allowance for U.S. Appl. No. 15/958,960, mailed Feb. 14, 2024, 4 pgs.

Notice of Allowance for U.S. Appl. No. 18/397,978, mailed Mar. 19, 2025, 9 pgs.

Office Action for U.S. Appl. No. 15/990,279, mailed Oct. 22, 2025, 17 pgs.

Notice of Allowance for U.S. Appl. No. 18/828,853, mailed Nov. 19, 2025, 5 pgs.

* cited by examiner

402

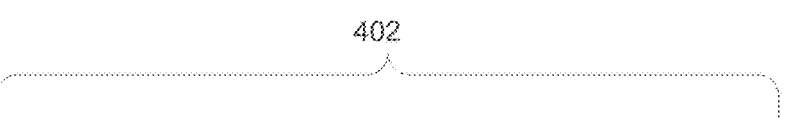

{"question":"did the agent use the standard company greeting?", "context":"Thank you for calling XYZ customer service, how can I help you today I'm sorry sir what seems to be the problem yep I apologize sir I have your name and account number so I can take a look at this for you OK so I see in your account records that I have an outstanding bill for two all-in-one printers is that the bill concerned about what did you receive printers OK I'm sorry your bill is for two printers though OK are you Are you sure you only received one printer OK might change your bill for one printer so it should reflect to your account we now offer damage protection if you are interested no okay."}

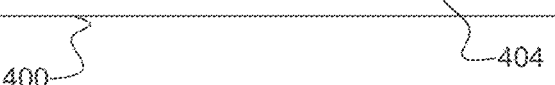

{

"context":"Thank you for calling XYZ customer service, how can I help you today I'm sorry sir what seems to be the problem yep I apologize sir I have your name and account number so I can take a look at this for you OK so I see in your account records that I have an outstanding bill for two all-in-one printers is that the bill concerned about what did you receive printers OK I'm sorry your bill is for two printers though OK are you Are you sure you only received one printer OK might change your bill for one printer so it should reflect to your account we now offer damage protection if you are interested no okay.", "question":"did the agent use the standard company greeting?",
"proba_yes":0.96,
"proba_no":0.04
}

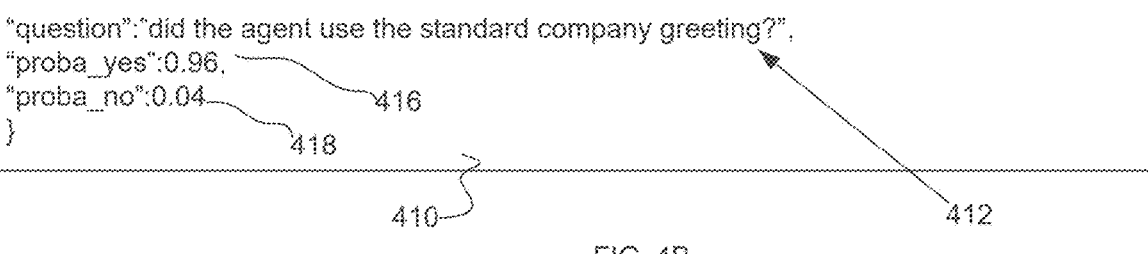

| Evaluation ID | Interaction ID | Channel | Eval Form ID | | | | | |
|---|---|---|---|---|---|---|---|---|
| Question | | | Weight | ML Answer | Score | Eval Answer | Score | Change |
| Did the agent use the standard company greeting? | | | 5.000 | Yes | 1.000 | Yes | 1.000 | No |
| Did the agent offer additional products and services? | | | 5.000 | No | 0.000 | Yes | 1.000 | Yes |
| Did the agent use the standard company greeting? | | | 5.000 | Yes | 1.000 | Yes | 1.000 | No |

600

ARTIFICIAL INTELLIGENCE BASED SETTING OF CONTROLS IN A USER INTERFACE

TECHNICAL FIELD

Embodiments of the present disclosure relate to machine learning based assessment of human interactions. Even more particularly, some embodiments are related to using machine learning based assessments of human interactions to automatically set controls in a graphical user interface.

BACKGROUND

Call center technologies allow an organization to handle a large volume of calls from the public. Many call centers incorporate technologies to periodically evaluate calls. Call evaluation technologies typically record calls between agents of the call center and the public and provide computer-based evaluations to allow evaluators to assess the calls. Call evaluation typically includes recording a call, generating a transcript of the call, and providing a graphical user interface to an evaluator that allows the evaluator to read the transcript, listen to the recorded call and answer questions about the call. In a typical call center evaluation scenario, an evaluator listens to a randomly selected call of a specific agent and uses the graphical user interface provided by the evaluation system to answer questions about the call. The agent or call is attributed a quality score based on how the questions were answered.

Conventional call evaluation technologies suffer from drawbacks. First, the evaluation of a call can takes a significant amount of evaluator time such that only a small sample of the massive call volume handled by the call center can be evaluated. Second, they are prone to human error, bias, or carelessness, such as evaluators not understanding performance standards, failing to enforce standards consistently, or failing to fully listen to parts of a call due to fatigue or other conditions. This can lead to an inaccurate review of the call center agent under evaluation. As another shortcoming, only a small percentage of the massive volume of calls handled by the call center can be evaluated.

SUMMARY

One embodiment comprises a system for artificial intelligence-based evaluation of an agent interaction. The system comprises a processor and a data store. The data store stores a voice session recording of a call and an evaluation question set. The system further comprises an evaluation operator interface for displaying an evaluation question from the evaluation question set and an answer control settable to indicate a response to the evaluation question. The system further comprises a non-transitory computer readable medium storing instructions executable by the processor to parse the evaluation question set to identify the evaluation question for an intended call participant interaction, submit the evaluation question and the voice session recording to a machine learning model; determine, using the machine learning model, that the intended call participant interaction of the evaluation question is present in the voice session recording; and when the intended call participant interaction is present in the voice session recording, record a first answer as the response to the evaluation question for the voice session recording, the first answer indicating a presence of the intended call participant interaction in the voice session recording and automatically set the answer control in the evaluation operator interface to a first setting to indicate the presence of the intended call participant interaction in the voice session recording.

Furthermore, embodiments herein provide an advantage by providing systems and methods that can automatically and accurately set an operator control using an artificial intelligence-based model. The system is operable to evaluate an interaction based on a large number of questions and provide an accurate setting of the operator control response for each question. Further, the accuracy of evaluation can increase through incorporating feedback with respect to answers provided using the model.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4A is a diagrammatic representation one embodiment of a request to a machine learning model;

FIG. 4B is a diagrammatic representation one embodiment of a response from a machine learning model;

DETAILED DESCRIPTION

Figure 1:
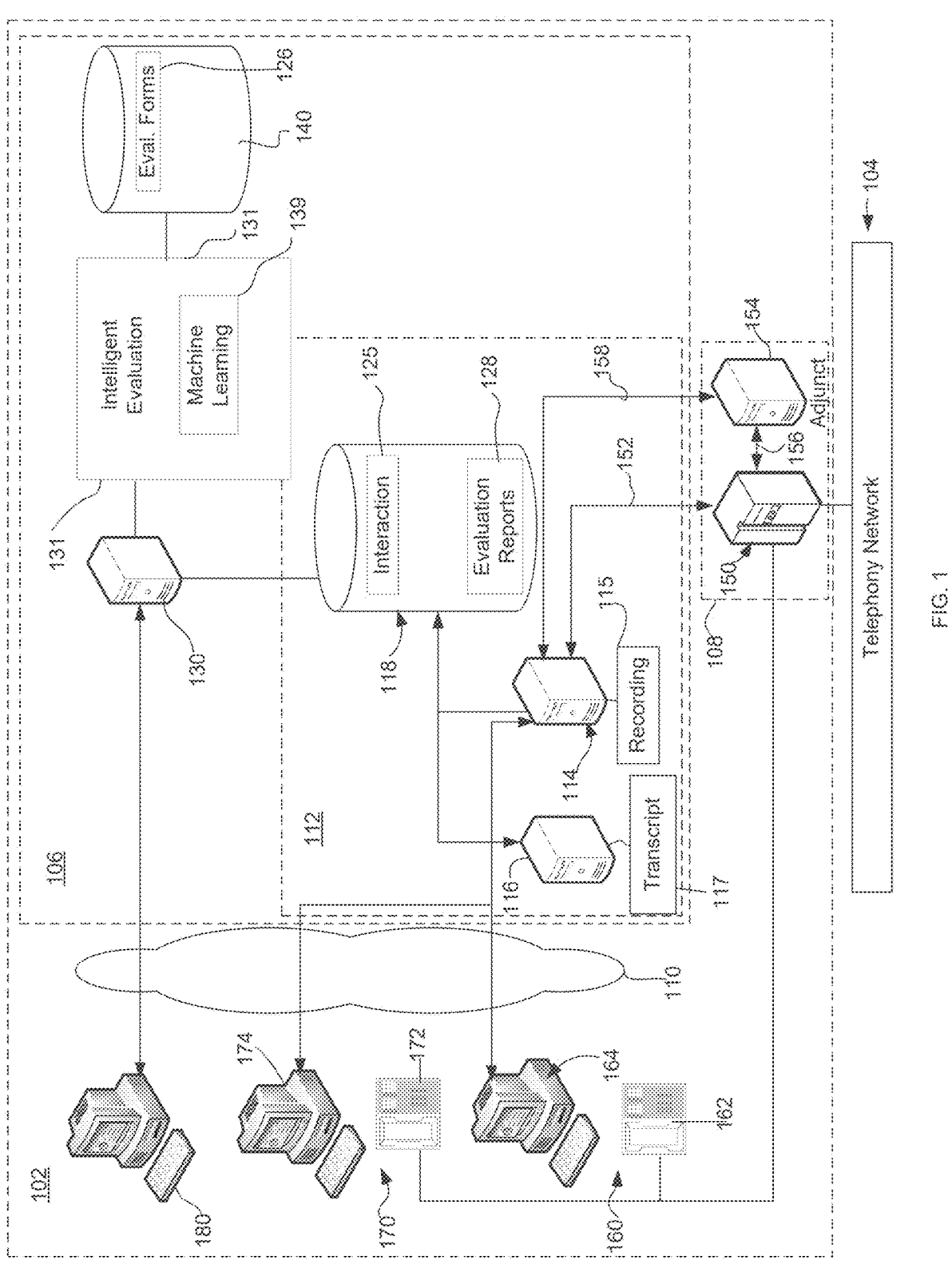
FIG. 1 is a diagrammatic representation of one embodiment of a call center system coupled to a telephony network.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Embodiments of the present disclosure provide systems and methods for using machine learning (ML) to evaluate human interactions. ML can be incorporated in human-out-of-the-loop (HOTL) evaluation processes or human-in-the-loop (HITL) evaluation processes. A HOTL evaluation process does not require human interaction to confirm or change the answers determined using the ML model, whereas a HITL evaluation process involves human interaction and judgment to confirm or change the answers determined using the ML model to arrive at final answers. Some embodiments use a HOTL process for evaluating some interactions and a HITL process for evaluating other interactions. In some HITL process embodiments, the answers determined by ML based on assessing an interaction are used to preset answer controls in an evaluation interface for a human evaluator evaluating the interaction.

In accordance with one embodiment, ML is used in an evaluation process to evaluate interactions recorded at a call center. The use of ML in this manner presents several advantages over conventional call center evaluation systems. As one advantage, ML can be used to evaluate many interactions that would otherwise go unevaluated, giving the organization implementing or using the call center greater insight as to how its agents are performing and enabling the organization to identify risks to the organization more quickly. As another example, ML can be used to increase the accuracy of HITL evaluations. Using an ML model to pre-answer questions for a human evaluator increases the overall accuracy of the HITL evaluation process while a HITL review of the ML model's answers can be used to increase the accuracy of the ML model.

Further, compared to methods for automatic presetting of answer controls using autoscore templates that depend on lexicons, embodiments of the present disclosure do not require an organization to define and maintain complex autoscore templates and to update associated lexicons, though embodiments described herein can be used in conjunction with autoscore templates and lexicons.

FIG. 1 is a block diagram illustrating one embodiment of a call center system 102 coupled to telephony network 104, such as a public switched telephone network (PSTN), VoIP network or other network that can establish call sessions with call center system 102. A call center may receive many calls over telephony network 104 at any given time. Call center system 102 102 channels these calls and takes a variety of actions with respect to the calls. Among other functionalities, call center system 102 collects data about the calls, call center or callers during the calls. Call center system 102 stores the audio portion of a call (referred to as a "voice session recording") in conjunction with data collected for the call.

Call center system 102 comprises a platform 106 coupled to a voice network 108 and a data network 110. Voice network 108 comprises a call routing system 150 to manage calls. The call routing system 150 can connect incoming calls to terminals in call center system 102 and outgoing calls to telephony network 104. Call routing system 150 may comprise any combination of hardware and/or software operable to route calls. According to one embodiment, call routing system 150 comprises an automatic call distributor (ACD) with interactive voice response (IVR) menus. A customer may provide input via voice or touch-tone keypad to the IVR. The ACD takes the input received by the IVR and appropriately routes the call to the most appropriate agent using a set of predefined criteria. In addition, or in the alternative, call routing system 150 may include a private branch exchange switch or other call routing hardware or software.

The ACD or other call routing component performs one or more various functions, such as recognizing and answering incoming calls, determining how to handle a particular call, identifying an appropriate agent and queuing the call, and/or routing the call to an agent when the agent is available. The call routing system 150 uses information about the call, caller or call center or other information gathered by call center system 102 to determine how to route a call. For example, the call routing system may use the caller's telephone number, automatic number identification (ANI), dialed number identification service (DNIS) information, the caller's responses to voice menus, the time of day, or other information to route a call. The call routing system 150 communicates with data network 110, a private branch exchange or other network either directly or indirectly, to facilitate handling of incoming calls. The call routing system 150 may also be operable to support computer-telephony integration (CTI).

Call routing system 150 is coupled to recording server 114 of platform 106 by communications lines 152. Lines 152 support a variety of voice channels that allow platform 106 to monitor and record voice sessions conducted over a voice network 108. Call routing system 150 is also coupled to a voice instrument 162 at agent workstation 160 and a voice instrument 172 at supervisor workstation 170 via a private branch exchange link, VoIP link or other call link. Platform 106 receives information over lines 152 regarding the operation of call routing system 150 and the handling of calls received by call center system 102. This information may include call set-up information, traffic statistics, data on individual calls and call types, ANI information, DNIS information, CTI information, or other information that may be used by platform 106.

Voice network 108 can further include adjunct services system 154 coupled to call routing system 150, and call recording server 114 by data links 156, 158. Adjunct services system 154 comprises a CTI application or platform, contact control server, or other adjunct device accessible by platform 106 to perform call center functions. Adjunct services system 154 includes a link to other components of the call center's management information system (MIS) host for obtaining agent and supervisor names, identification numbers, expected agent schedules, customer information, or any other information relating to the operation of the call center.

Data network 110 may comprise the Internet or other wide area network (WAN), an enterprise intranet or other a local area network (LAN), or other suitable type of link or combination of links capable of communicating data between platform 106 and computers 164 at agent workstations 160, computers 174 at supervisor workstations 170 and client computers 180 of other types of users. Data network 110 also facilitates communications between components of platform 106. Although FIG. 1 illustrates one agent workstation 160, one supervisor workstation 170 and one additional user computer 180, it is understood that call center system 102 may include numerous agent workstations 160, supervisor workstations 170 and user computers 180. Computers 164, 174 and 180 may be generally referred to as user client computers.

Platform 106 includes a recording system 112 to record interactions such as voice sessions, data sessions, text sessions, or a combination thereof. In the embodiment illustrated, recording system 112 includes a recording server 114 and an ingestion server 116. Recording server 114 comprises a combination of hardware and/or software operable to implement recording services to acquire voice interactions on VoIP, TDM or other networks, and record the voice sessions. Recording server 114 may also be operable to record data sessions for calls. A data session may comprise keyboard entries, screen display and/or draw commands, video processes, web/HTTP activity, email activity, fax activity, applications or any other suitable information or process associated with a client computer. To facilitate recording of data sessions, agent computers 164 or supervisor computers 174 may include software to capture screen interactions related to calls and send the screen interactions to recording server 114. Recording server 114 stores session data for voice and data interactions in data store 118.

Ingestion server 116 comprises a combination of hardware and software operable to process voice session recordings recorded by recording server 114 or live calls and perform speech-to-text transcription to convert live or recorded calls to text, forming a transcript of the interaction. Ingestion server 116 stores the transcript of the interaction in association with the interaction recording as in data store 118.

Data store 118, which may comprise one or more databases, file systems or other data stores, including distributed data stores, stores interaction data 125 for recorded interactions. According to one embodiment, the interaction data 125 for a recorded call includes the transcript of a call and interaction metadata used to manage the interaction, such as a unique id assigned to the interaction. The interaction data 125 for a recorded call, in one embodiment, further comprises one or more of the call recording, the session data recorded for the call, or additional interaction metadata. The additional interaction metadata may include, for example, metadata provided to recording server 114 by routing system 150 or adjunct services system 154, such as call set-up information, traffic statistics, call type, ANI information, DNIS information, CTI information, agent information, MIS data or other data. For example, the interaction metadata for a call may include call direction, line on which the call was recorded, ANI digits associated with the call, DNSI digits associated with the call, extension of the agent who handled the call, team that handled the call (e.g., product support, finance), whether the call had linked calls, name of agent who handled the call, agent team or other data. The interaction metadata may further include data received from agent computers 164, supervisor computers 174, or other components, such as classifications (pre-defined or ad hoc tag names) assigned to the call by a member, classification descriptions (descriptions of predefined or ad hoc tags assigned by a call center member to a call) other Interaction metadata. The interaction metadata may further include call statistics collected by recording server 114, such as the duration of a voice session recording, time voice session was recorded and other call statistics.

Intelligent data processing system 130 provides a variety of services such as support for call recording, performance management, real-time agent support, and multichannel interaction analysis. Intelligent data processing system 130 comprises one or more computer systems with central processing units executing instructions embodied on one or more computer readable media where the instructions are configured to perform at least some of the functionality associated with embodiments of the present invention. These applications may include an intelligent evaluation application 131 comprising one or more applications (instructions embodied on a computer readable media) configured to implement one or more interfaces utilized by the data processing system 130 to gather data from or provide data to client computing devices, data stores (e.g., databases or other data stores) or other components.

The interfaces may include interfaces to connect to various sources of unstructured information in an enterprise in any format, including audio, video, and text. It will be understood that the interface utilized in a given context may depend on the functionality being implemented by data processing system 130, the type of network utilized to communicate with any particular system, the type of data to be obtained or presented, the time interval at which data is obtained from the entities, the types of systems utilized. Thus, these interfaces may include, for example web pages, web services, a data entry or database application to which data can be entered or otherwise accessed by an operator, APIs, libraries, or other types of interfaces which it is desired to utilize in a particular context.

Intelligent data processing system 130 includes a data store 140 that stores various templates, files, tables and any other suitable information to support the services provided by data processing system 130. Data store 140 may include one or more databases, file systems or other data stores, including distributed data stores.

Intelligent evaluation application 131 comprises code executable to process data obtained by data processing system 130 or processed data to generate further processed data. Different combinations of hardware, software, and/or firmware may be provided to enable interconnection between different modules of the system to provide for the obtaining of input information, processing of information and generating outputs.

Intelligent evaluation application 131 code executable to manage evaluation of interactions according to evaluation forms 126 to generate evaluation reports 128. Evaluation forms 126 are templates for evaluations. Evaluation forms 126 specify the questions to answer when evaluating the voice session recordings recorded by the recording server 114. The evaluation questions of a specific evaluation form 126 may be directed to a specific category, such as evaluation of a sales ability of the employee. Alternatively, an evaluation form 126 may include questions directed to a plurality of evaluation categories, spanning multiple employee abilities. The evaluation forms, in some embodiments, also define acceptable answers to the questions. In one embodiment, evaluation forms 126 are saved as corresponding JavaScript Object Notation (JSON) files in data store 140.

Intelligent evaluation application 131 is executable to use an ML model 139 to analyze the transcripts to answer evaluation questions. According to one embodiment, ML model 139 comprises a natural language processing model (NLP), large language model (LLM) that is implemented or accessible by the intelligent evaluation application 131 to answer the evaluation questions from an evaluation form 126. In an even more particular embodiment, ML model 139 is a generative pre-trained transformer model.

Intelligent evaluation application 131 stores the evaluation questions and the answers determined by ML model 139 in a corresponding evaluation report 128 for the interaction. In addition, or in the alternative, intelligent evaluation application 131 uses the answers determined by ML model 139 to set answer controls in an evaluation operator interface for human evaluation of the interaction and stores the human evaluator's answers in the evaluation report 128.

Data store 118 thus includes evaluation reports 128, where the evaluation reports correspond to interactions represented in interaction data 125. An evaluation report 128 comprises a completed or partially completed evaluation of an associated interaction. More particularly, an evaluation report 128 for an interaction comprises evaluation answers to evaluation questions, where the evaluation answers were provided by ML model 139 or by another evaluator—for example, a human evaluator in a HITL process-based on an assessment of the interaction. In some embodiments, an evaluation report 128 produced by a HITL process includes both the answers determined by ML model 139 and an indication of whether the human evaluator agreed with the answers provided by ML model 139.

In some embodiments, intelligent evaluation application 131 scores interactions and stores quality scores in evaluation reports 128 in data store 118. The quality scores comprises one or more numbers representing how well an agent performed.

Intelligent data processing system 130 can include a variety of additional or alternative components for processing interaction data. According to one embodiment, an intelligent data processing system implements a server tier, an example embodiment of which is discussed in conjunction with FIG. 2.

In one embodiment of operation, call routing system 150 initiates a session at call center system 102 in response to receiving a call from telephony network 104. Call routing system 150 implements rules to route calls to agent voice instruments 162, supervisor voice instruments 172 or recording server 114. Depending on the satisfaction of a variety of criteria (e.g., scheduling criteria or other rules), routing system 150 may establish a connection using lines 152 to route a call to a voice instrument 162 of an agent workstation 160 and recording server 114. Routing system 150 may also establish a connection for the call to the voice instrument 172 of a supervisor.

Recording server 114 stores data received for a call from adjunct services system 154 and routing system 150, such as call set-up information, traffic statistics, call type, ANI information, DNIS information, CTI information, agent information, MIS data. In some cases, recording server 114 may also store a recording of the voice session for a call. Additionally, recording server 114 may record information received from agent computer 164 or supervisor computer 174 with respect to the call such as screen shots of the screen interactions at the agent computer 164 and field data entered by the agent. For example, platform 106 may allow an agent to tag a call with predefined classifications or enter ad hoc classifications and recording server 114 may store the classifications entered by the agent for a call.

Recording server 114 generates a recording 115 of the voice session between the agent and the caller and stores recording 115 as interaction data 125 for the call. For example, when recording server 114 records a voice session to generate recording 115, recording server 114 can associate recording 115 with a unique interaction id and store an interaction having the interaction id in data store 118, where the interaction includes recording 115.

Recording 115 is processed by ingestion server 116 to generate a transcript 117 of the session and stores the transcript as part of interaction data 125 for the call. Ingestion server 116, in some embodiments also records interaction metadata for the call as part of the interaction data 125 for the call. A data session may also be linked to the interaction id. Thus, the interaction data 125 for the call may further include a recording of a data session associated with the call, such as a series of screenshots captured from the agent computer 164 during a voice session.

In some embodiments, the voice session is recorded as separate recordings of the agent and caller and thus, interaction data 125 for a call may include an agent recording, a customer recording, a transcript of the recording of the agent (agent transcript), a transcript of the recording of the caller (inbound caller transcript) and associated metadata. According to one embodiment, the voice session recording 115, transcript of the voice session, and data session recording for a call are stored in a file system and the interaction metadata is stored in a database with pointers to the associated files for the interaction.

Intelligent evaluation application 131 receives or generates an evaluation initiating event to evaluate the call using a selected evaluation form 126. Examples of evaluation initiating events include, but are not limited to, a human evaluator selecting to evaluate the call using the template form, a scheduler invoking an evaluation of the call using the evaluation form, or the initiation of a batch evaluation using the evaluation form. Intelligent evaluation application 131 accesses the evaluation form 126, extracts the evaluation questions and, in some embodiments, the acceptable answers from the evaluation form 126, accesses transcript 117, and provides the text from transcript 117 and prompts to ML model 139 for evaluation. The prompts comprise the question text or related prompts and, in some embodiments, the acceptable answers extracted from the evaluation form. ML model 139 returns ML answers to the evaluation questions, which intelligent evaluation application 131 stores in an evaluation report for the call.

In a HITL process, intelligent evaluation application 131 uses the ML answers to preset answer controls in an evaluation operator interface populated according to the selected evaluation form 126. A human evaluator uses the evaluator operator interface to evaluate the call. Intelligent evaluation application 131 stores an indication of whether the human evaluator agreed with the answers provided by ML model 139 for the call, in the evaluation report 128 for the call.

Figure 2:
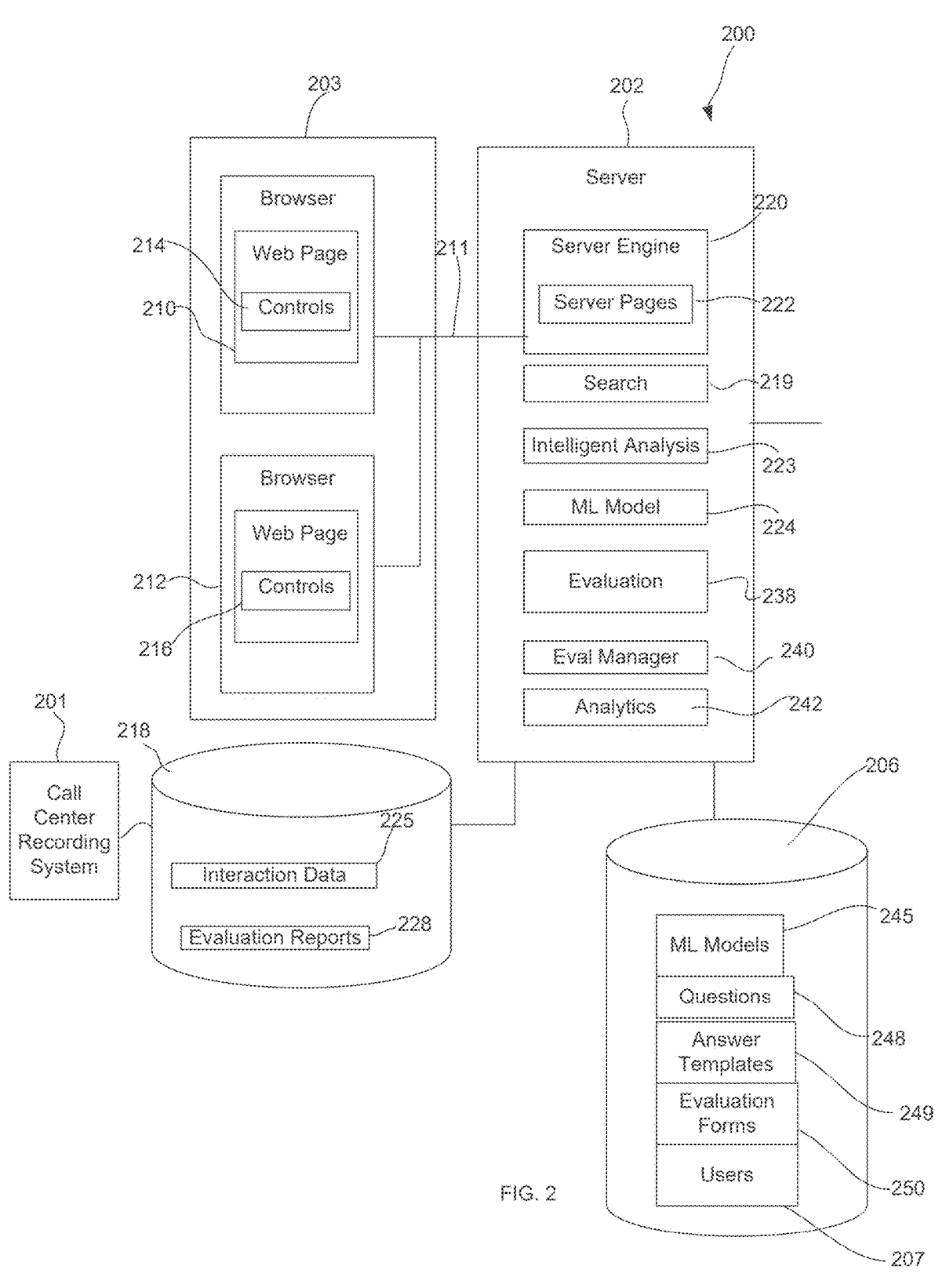
FIG. 2 is a diagrammatic representation of one embodiment of an evaluation system.

FIG. 2 is a diagrammatic representation of one embodiment of an evaluation system 200 operable to access and evaluate interactions recorded by a call center call recording system 201, such as recording system 112.

Call center recording system 201 may be any suitable recording system that records and transcribes calls between agents and incoming callers.

Call recording system 201 stores interaction data 225 for recorded interactions in data store 218, which comprises one or more databases, file systems or other data stores, including distributed data stores. The interaction data 225 for an interaction comprises the transcript of a call and interaction metadata used to manage the interaction, such as a unique id assigned to the interaction. According to one embodiment, the interaction data 225 for an interaction further comprises one or more of additional interaction metadata or a voice session recording of an inbound call recorded by a call center recording system. The interaction data 225 for an interaction may further include a data session recording.

Data store 218 further stores evaluation reports 228, where the evaluation reports correspond to interactions represented in interaction data 225. An evaluation report 228 comprises a completed or partially completed evaluation of an associated interaction. More particularly, an evaluation report 228 for an interaction comprises evaluation answers to evaluation questions, where the evaluation answers were provided by ML model 224 or by another evaluator—for example, a human evaluator in a HITL process-based on an assessment of that interaction. In some embodiments, an evaluation report 228 produced by a HITL process includes both the answers determined by ML model 224 and an indication of whether the human evaluator agreed with the answers provided by ML model 224.

In some embodiments, interactions, and evaluation reports are implemented as objects that contain data and implement stored procedures. Thus, interaction data 225 or evaluation reports 228, in some embodiments, comprises data to persist corresponding interaction objects or evaluation report objects.

Evaluation system 200 comprises a server tier 202, a client tier 203, a data store 206 and a data store 218. The client tier 203 and server tier 202 are connected by a network 211. The network 211 comprises the Internet or other WAN, an enterprise intranet or other LAN, or other suitable type of link or combination of links capable of communicating data between the client and server platforms. According to one embodiment, server tier 202 and data store 206 are implemented by intelligent data processing system 130 and data store 140, client tier 203 is implemented on one or more client computers, such as computers 180, and data store 218 is an example of data store 118.

Client tier 203 comprises a combination of hardware and software to implement designer operator interface 210 for configuring evaluation forms 250. Designer operator interface 210 includes controls 214 that allow designers to configure questions 248, answer templates 249, and evaluation forms 250. Client tier 203 further comprises a combination of hardware and software to implement evaluation operator interface 212 for displaying evaluations (instances of evaluation forms 250) with controls to allow human evaluators to evaluate interactions. According to one embodiment, designer operator interface 210 and evaluation operator interface 212 comprise one or more web pages that include scripts to provide controls 214 and controls 216.

Server tier 202 comprises a combination of hardware and software to implement platform services components comprising search component 219, server engine 220, a server-side artificial intelligence engine 223, an evaluation design component 238, an evaluation manager 240, and a server-side analytics component 242. Artificial intelligence engine 223 includes or accesses an ML model 224. According to one embodiment, ML model 224 comprises a large language model (LLM) that is implemented or accessible by the artificial intelligence engine 223 to answer evaluation questions. In an even more particular embodiment, ML model 224 is a generative pre-trained transformer model.

As discussed below, embodiments can support a wide variety of answer types (e.g., yes/no, selection lists, etc.). ML model 224, according to one embodiment, includes a plurality of ML models, where each ML model is tuned to answer a particular type of question or for a particular answer set (e.g., label space).

In the embodiment of FIG. 2, data store 206, which comprises one or more databases, file systems or other data stores, including distributed data stores, stores a variety of data used by server-tier 202, such as users data 207 regarding users of a call center platform (e.g., names, roles, teams, permissions and other data about users), ML model data 245 to persist ML model 224, questions 248, answer templates 249 and evaluation forms 250.

According to one embodiment, ML models, users, questions, answer templates, or evaluation forms are implemented as objects (e.g., model objects, user objects, question objects, answer template objects, evaluation form objects) that contain data and implement stored procedures. In such an embodiment, ML model data 245, users data 207, questions 248, answer templates 249, or evaluation forms 250 comprise data to persist corresponding question objects, answer template objects, and evaluation form objects. In one embodiment, the evaluation forms 250 are saved as corresponding JavaScript Object Notation (JSON) files in data store 206.

Search component 219 provides a search engine that indexes data in data store 206 or data store 218 to create a search index, such as an inverted index storing term vectors. More particularly in one embodiment, search component 219 can be a search tool configured to index transcripts of interaction data 225 in data store 218.

Server tier 202 comprises a server engine 220 configured with server-side pages 222 that includes server-side scripting and components. The server-side pages 222 are executable to deliver application pages to client tier 203 and process data received from client tier 203. The server-side pages 222 may interface with other components of server tier 202.

As a part of server tier 202, artificial intelligence engine 223 automatically reviews transcripts of interactions to answer questions included in evaluation forms 250—for example, evaluation forms selected by an evaluator or according to a configuration. In one embodiment, evaluation system 200 receives a selection of a transcript to evaluate and the evaluation form 250 to use for the evaluation. Artificial intelligence engine 223 parses the evaluation form 250 to identify the one or more evaluation questions of the evaluation form 250, accesses the selected transcript from interaction data 225 and applies ML model 224 to the transcript and the parsed evaluation questions, to generate a set of ML answers corresponding to the respective evaluation questions. In one embodiment, the ML answers determined by the ML model 224 are stored in a corresponding evaluation report 228 for the interaction. In addition, or in the alternative, the answers determined by artificial intelligence engine 223 are used by evaluation manager 240 to set answer controls in an evaluation presented to an evaluator for an evaluator-in-the-loop evaluation. Evaluation manager 240 uses the evaluation questions and the corresponding evaluation answers to assemble or update an evaluation report 228. In some embodiments, the answer to a question recorded in an evaluation report 228 may indicate a presence of the intended call participant interaction in the voice session recording or transcript.

In general, ML and human evaluator-based evaluations of evaluation system 200 are conducted based on evaluation forms 250 that define the questions, acceptable answers, and quality scoring data. In the embodiment illustrated, an evaluation form 250 defines the questions, acceptable answers, and quality scoring data by incorporating questions 248 and answer templates 249. Questions 248 define questions for potential inclusion in evaluation forms. Answer templates 249 define acceptable answers for an answer type and answer quality scores for the acceptable answers. Evaluation forms 250 reference questions 248 and questions 248 reference answer templates 249. By separating evaluation forms 250, questions 248, and answer templates 249, questions 248 can be easily reused across multiple evaluation forms and answer templates 249 can be easily applied to multiple questions 248.

Designer operator interface 210 provides tools to allow a designer to create and edit evaluation forms 250, questions 248, and answer templates 249. FIG. 3A-3G are diagrammatic representations of embodiments of designer operator interface pages 300, 310, 330, 340, 350, 360, 370 and FIG. 3H is a diagrammatic representation of one embodiment of evaluation form data. The operator interface pages can be constructed, for example, by evaluation design component 238.

Figure 3A:
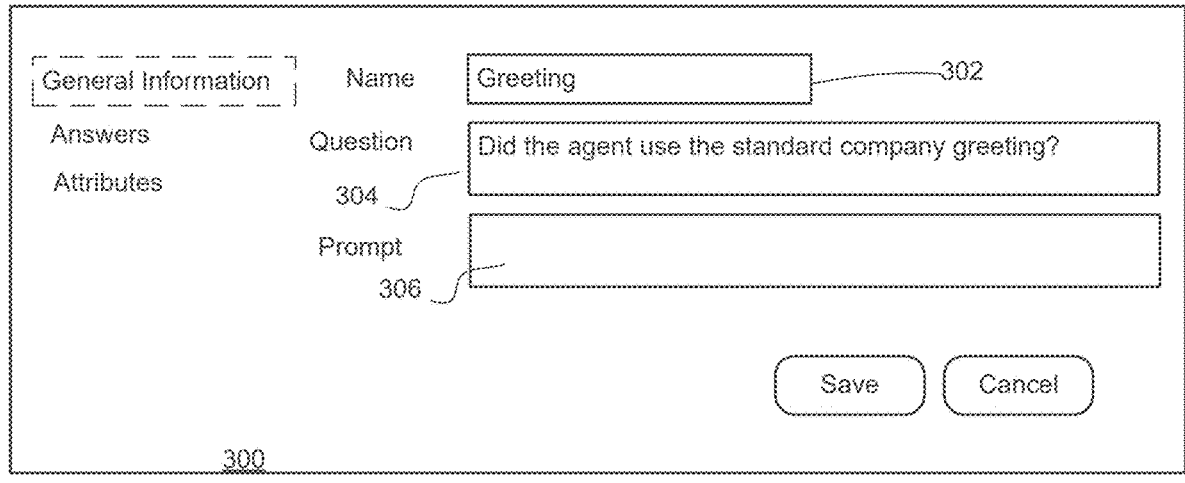
FIG. 3A is a diagrammatic representation of one embodiment of a designer operator interface page.

Turning to FIG. 3A, designer operator interface page 300 includes control 302 to allow the user to name a question and control 304 to allow the user to enter question text. In particular embodiments, the question text relates to an intended call participant interaction.

The question text is incorporated into an evaluation page when an evaluator evaluates a transcript using an evaluation form that incorporates the question. The question text is also used, in some embodiments, as the prompt for a large language model. In another embodiment, a user may enter alternative prompt text in control 306.

Figure 3B:
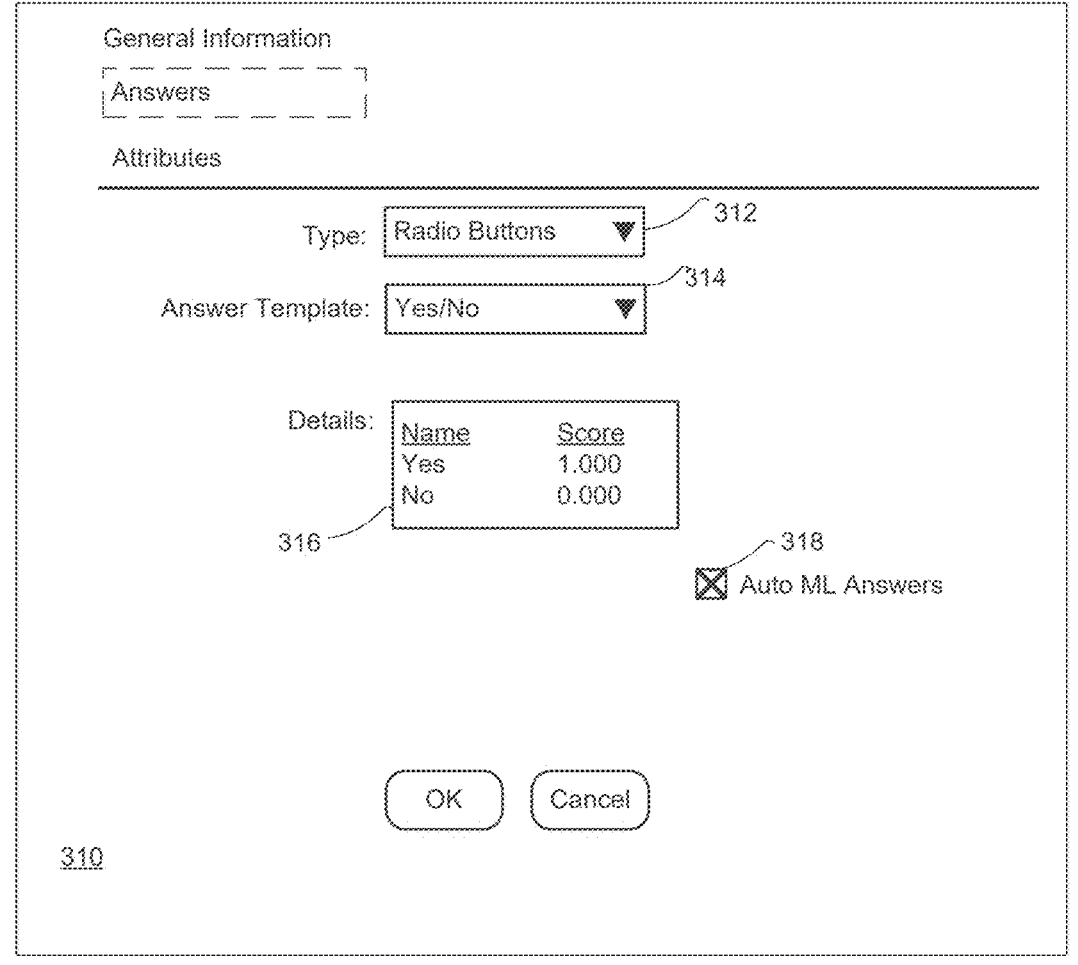
FIG. 3B is a diagrammatic representation of another embodiment of a designer operator interface page.

Turning to FIG. 3B, operator interface page 310 allows the user to provide answer parameters for the question specified in operator interface page 300. Operator interface page 310 includes an answer type control 312 that allows the user to specify what type of control will appear in the evaluation presented to an evaluator. Answer controls are included in the evaluation page based on the answer type selected. Examples of answer controls include, but are not limited to radio buttons, drop down list, edit box and multi-select. In the embodiment shown in FIG. 3B, answer type control 312 is represented as a list box to enable a selection of the type of selectable answer object.

Answer template control 314 allows the user to associate an existing answer template or a new answer template with the question. The user can add, edit or delete a selected answer template (e.g., an answer template selected from answer templates 249). The answer template control 314 may limit the answer templates from which the user may select based on the type selected in control 312. Area 316 displays answer details from the selected answer template, including the defined acceptable answers and corresponding answer quality scores defined in the answer template.

Control 318 allows the designer to specify whether the question is to be automatically answered using machine learning. If the user selects to enable machine learning answering of questions, then the evaluation system can use ML model 224 to answer the question. If the user selects not to use machine learning, then the acceptable answers and quality scores of a selected answer template will still apply, but evaluation system 200 will not automatically answer the question using ML model 224.

Figure 3C:
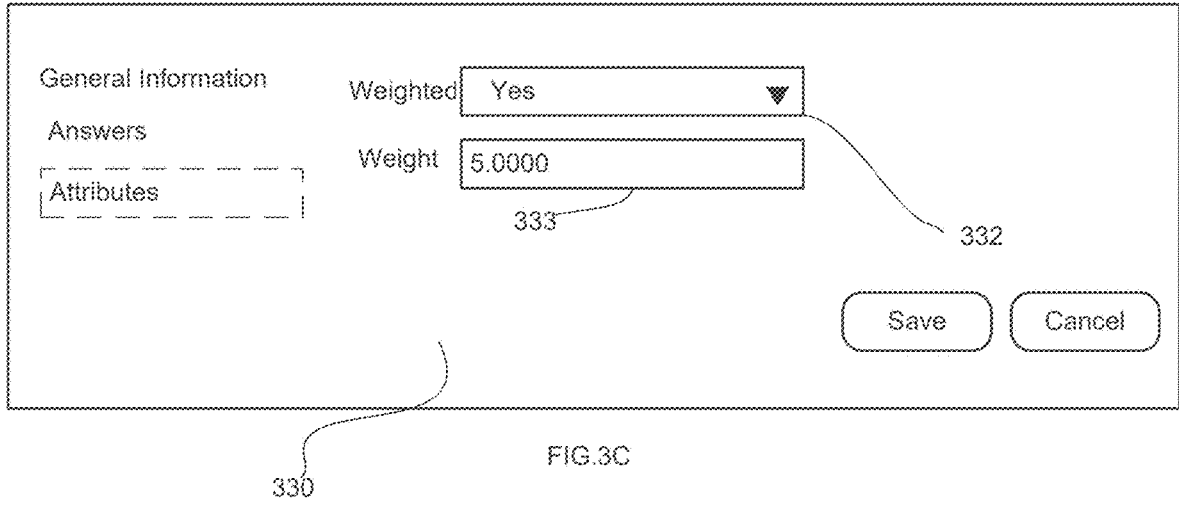
FIG. 3C is a diagrammatic representation of another embodiment of a designer operator interface page.

FIG. 3C illustrates one embodiment of a designer operator interface page 330 for specifying additional question settings for the question. Weight control 332 and weight control 333 allow the user to specify whether the question is weighted and to provide a weight indicating the relative importance of the question.

Figure 3D:
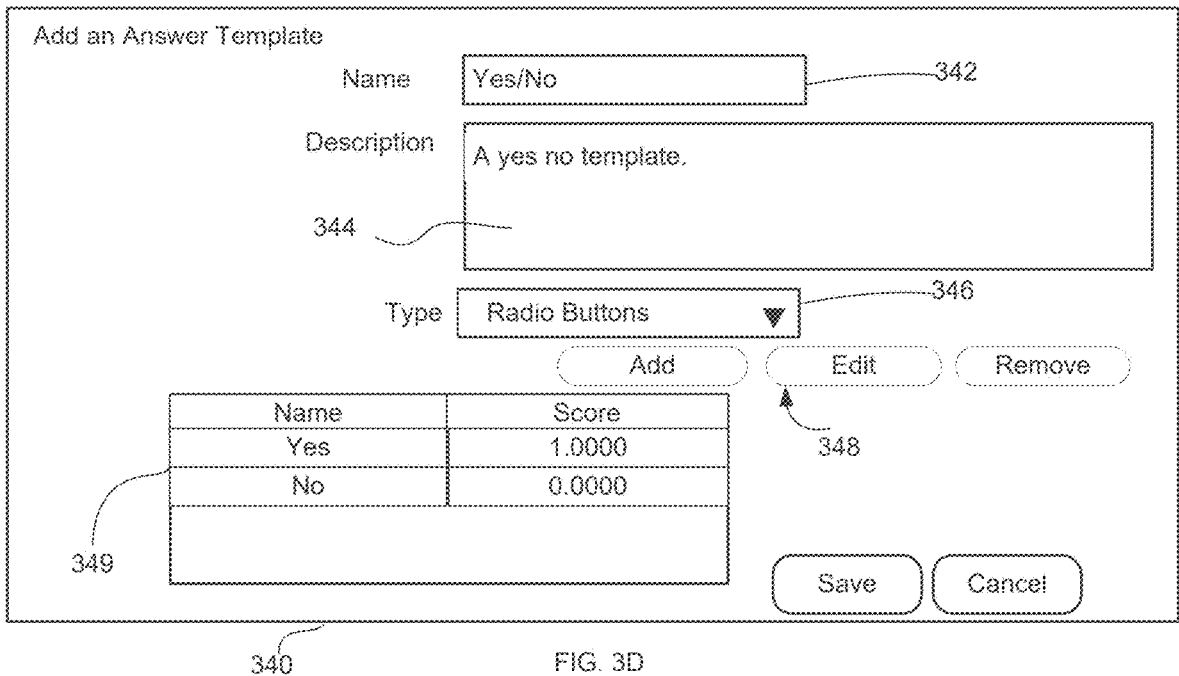
FIG. 3D is a diagrammatic representation of another embodiment of a designer operator interface page.

As discussed above, in one embodiment, a question includes an answer template by, for example, referencing the answer template (e.g., as selected via answer template control 314). FIG. 3D illustrates one embodiment of a designer operator interface page 340 for defining an answer template. Answer template settings are applied to each question that includes that answer template. Operator interface page 340 provides a control 342 that allows a user to input a name for an answer template and a control 344 that allows a user to input a description of the answer template. Operator interface page 340 further includes an answer type control 346 that allows the user to specify what type of control will appear in the evaluation presented to an evaluator. Examples include, but are not limited to radio buttons, drop down list, edit box and multi-select.

Operator interface page 340 further includes controls 348 to allow a user to add, edit, or delete acceptable answers and answer quality scores to/from the answer template. Details area 349 displays the acceptable answers defined for the answer template and associated answer quality scores.

Figure 3E:
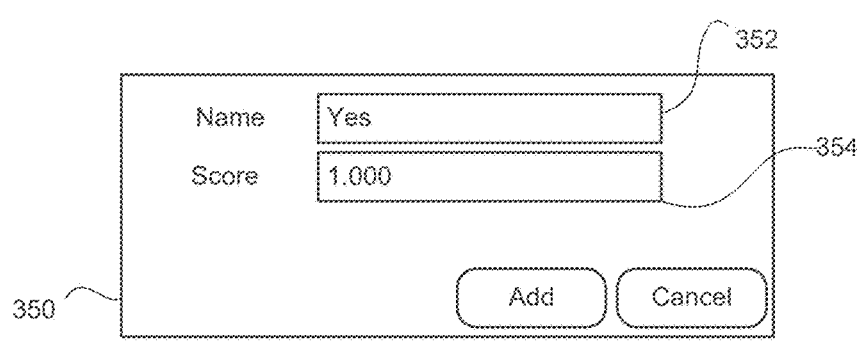
FIG. 3E is a diagrammatic representation of another embodiment of a designer operator interface page.

FIG. 3E is a diagrammatic representation of one embodiment of a designer operator interface page 350 that allows a user to add/edit an answer and an associated answer quality score. Operator interface page 350 includes a name control 352 and a score control 354. In the name control 352, the user can enter an acceptable answer for the answer template. In score control 354, the user can enter an answer quality score for that acceptable answer.

Figure 3F:
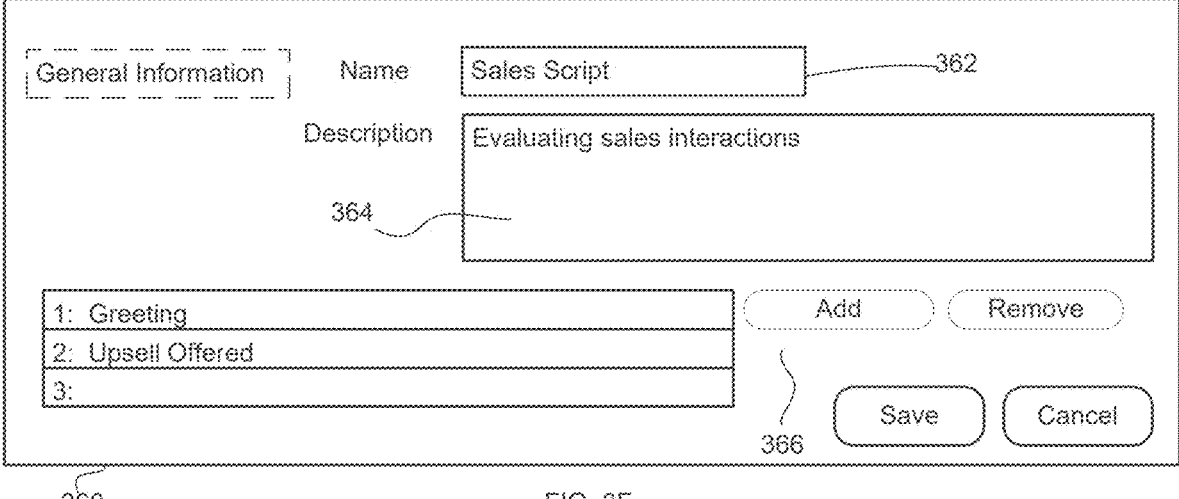
FIG. 3F is a diagrammatic representation of another embodiment of a designer operator interface page.
Figure 3G:
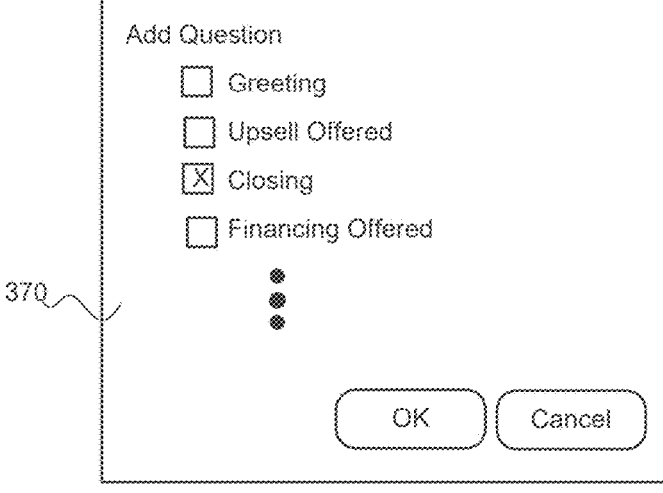
FIG. 3G is a diagrammatic representation of another embodiment of a designer operator interface page.
Figure 3H:
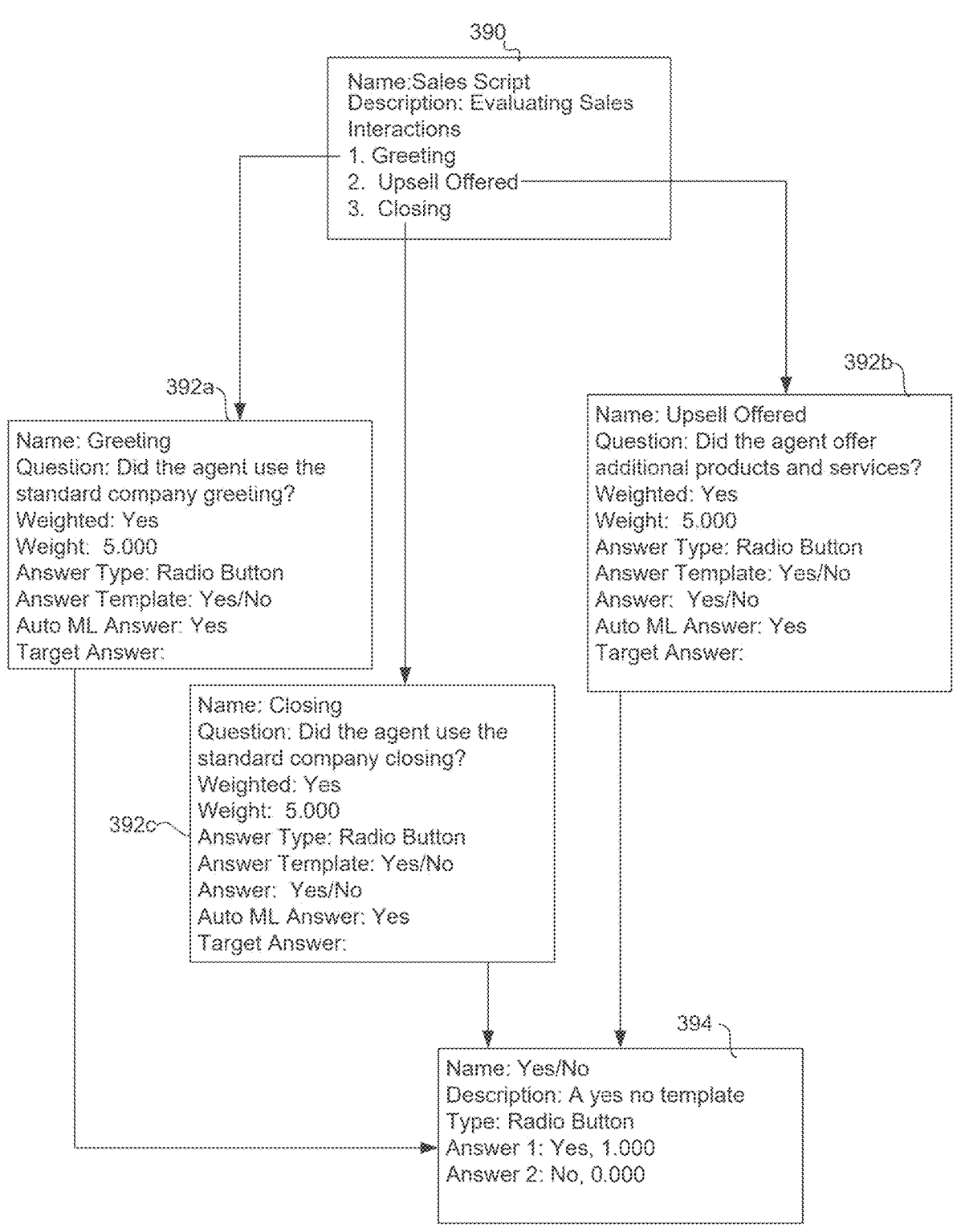
FIG. 3H is a diagrammatic representation of another embodiment of evaluation form data.

Turning to FIG. 3F, designer operator interface page 360 illustrates one embodiment of an operator interface page for defining an evaluation form. Form field 362 allows a user to input an evaluation form name and form field 364 allows the user to input a description of the evaluation form. Control 366 allows the user to select questions from a library of questions.

Responsive to the user selecting to add questions to the evaluation form (e.g., responsive to user interaction with control 366), the user can be presented with an operator interface page 370 (FIG. 3G) that provides controls to allow the user to select questions, from the library of questions 248, to link to the evaluation form. Based on the inputs reviewed via interaction with interface page 370, the evaluation system associates selected questions from question 248 with the evaluation form.

With reference to FIG. 3J, one embodiment of an evaluation form 390 is illustrated. The evaluation form 390 that references respective questions 392a, 392b, 392c and so on and the respective questions reference template object 394.

Referring briefly to FIG. 2, server tier 202 may thus receive question data, answer template data, and evaluation form data via interactions in operator interface 210. A question configured via operator interface 210 can be persisted as question 248 in data store 206, an answer template configured via operator interface 210 can be persisted as an answer template 249 in data store 206, and a template form configured via operator interface 210 can be stored as an evaluation form 250 in data store 206. Questions 248, answer templates 249, and evaluation forms 250 may be stored as records in one or more tables in a database, files in a file system or combination thereof or according to another data storage scheme.

Evaluations of interactions may be triggered by a variety of events. In some embodiments, evaluation manager 240 is configured with a schedule for using an evaluation form 250 to evaluate interactions that meet specified selection criteria. As another example, a human evaluator may select to evaluate a particular interaction to evaluate with an evaluation form. When an evaluation of an interaction is triggered, evaluation manager 240 accesses the evaluation form 250 specified for the evaluation, including the referenced questions 248 and answer templates 249. Further, evaluation manager 240 accesses the interaction data 225 for the subject interaction, particularly the transcript of the interaction. Evaluation manager 240 passes the transcript and evaluation form 250, including the referenced questions 248 and answer templates 249 to artificial intelligence engine 223 for evaluation. Artificial intelligence engine 223 parses the question text and answer type from each question and generates a request to ML model 224. In some embodiments, ML model 224 comprises a plurality of models with different models being trained for different answer templates or answer sets. In such an embodiment, artificial intelligence engine 223 generates a request to ML model 224 generates the request to the appropriate model. Using the example of the "Greeting" question (FIG. 3A and question object 392a of FIG. 3H), artificial intelligence engine 223 generates a request to an ML model 224 tuned to answer yes/no questions.

Turning briefly to FIG. 4A, one embodiment of the content of a request 400 to ML model 224 is illustrated. The request 400 includes a prompt 402 and context 404. In this example, prompt 402 includes the text of the question and context 404 is text from the transcript of the agent. If an alternative prompt is provided for the question (e.g., via control 306), the text of that prompt can be used in the prompt rather than the question text.

FIG. 4B illustrates an example response 410 from ML model 224. Response 410 includes the prompt 412 from request 400, the context 414 from request 400, and a probability for each answer in the answer set for which model 224 is tuned (e.g., yes probability 416 and no probability 418). Artificial intelligence engine 223 selects the highest probability answer as the ML answer to the question and returns the ML answer to the question to evaluation manager 240. In some embodiments, artificial intelligence engine 223 returns an N/A or other indicator that the ML model could not return an answer if there is no answer for which the probability meets a threshold probability.

The process can be repeated for each question in the selected evaluation form 250. Evaluation manager 240 stores ML evaluation data for the subject interaction in an evaluation report 228 for the interaction. The ML evaluation data, according to one embodiment, comprises the ML questions asked and the corresponding ML answers, weights, answer quality scores, and answer probability for the ML answer.

In some embodiments, artificial intelligence engine 223 returns the answer probabilities for all the acceptable answers to a question and evaluation manager 240 stores them in the evaluation record 128. Evaluation system 200, however, may be configured to consider the highest probability answer (or highest probability over a threshold) to be the ML answer to the evaluation question.

Figure 5A:
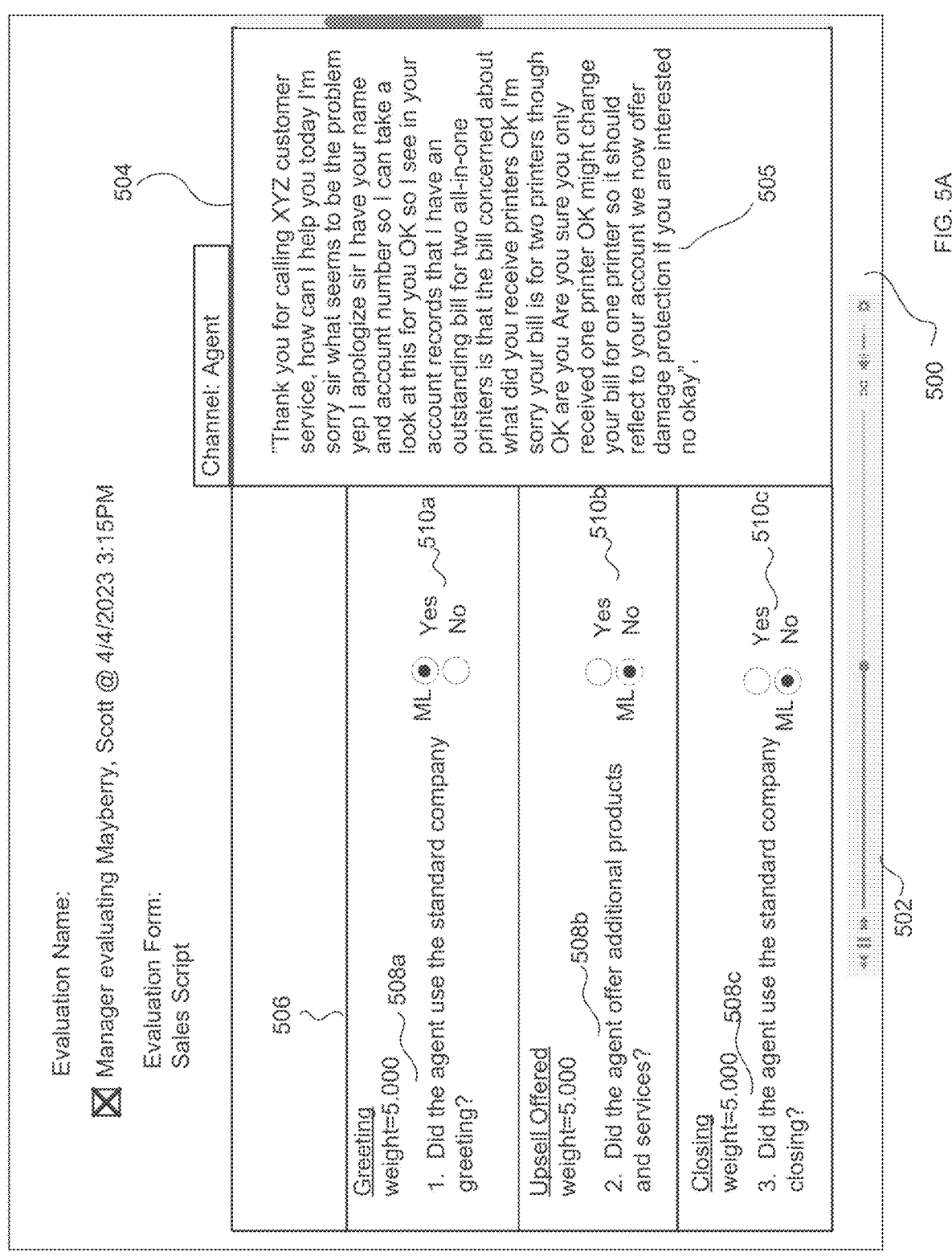
FIG. 5A is a diagrammatic representation of one embodiment of an evaluation operator interface page.

For a HITL evaluation of an interaction, evaluation system 200 provides an evaluation operator interface page to an evaluator for evaluating the interaction. The evaluation operator interface page 500 can be constructed by evaluation manager 240 using the appropriate evaluation form 250 from the data store 206. FIG. 5A illustrates one embodiment of an evaluation operator interface page 500 for evaluating an interaction. The evaluation operator interface page 500 can be visually displayed on a browser of client tier 203, as a web page.

In the embodiment illustrated, evaluation operator interface page 500 includes a media player 502, a transcript viewer 504 and an evaluation portion 506 displaying one or more questions of an evaluation. Media player 502 provides controls to allow the evaluator to play the voice session recording for the transaction being evaluated. Transcript viewer 504 displays the transcript 505 of the voice session recording synchronized with the media player.

Evaluation portion 506 comprises the questions 508a, 508b and 508c specified by the questions 392a, 392b, 392c linked to evaluation form 390 with the corresponding answer controls and acceptable answers specified in the answer template 394 linked to those questions. The questions 508a, 508b and 508c include answer controls (e.g., radio buttons) for indicating an answer 510a, 510b, 510c to the corresponding evaluation question.

Figure 5B:
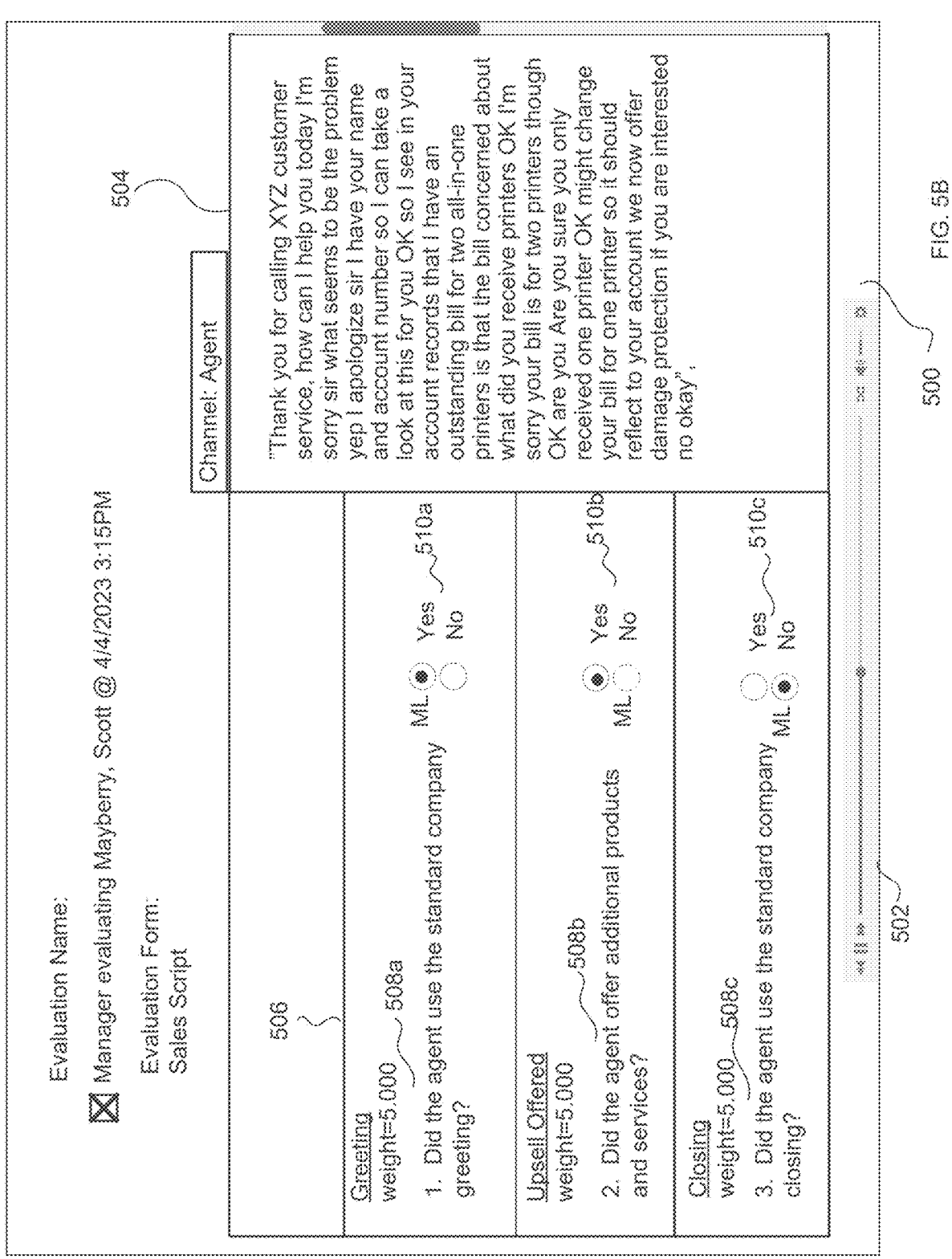
FIG. 5B is a diagrammatic representation of one embodiment of an evaluation operator page in which an evaluator has changed an answer control setting.

For a question selected for ML answering (e.g., via control 318 of FIG. 3B), evaluation manager 240 uses the evaluation answer determined for the interaction by ML model 224 to set the answer control in evaluation operator interface page. In this example, the selection of the answer "Yes" is preset for the question "Did the agent use the standard company greeting?", the answer "no" is preset for the question "Did the agent upsell?", and the answer "no" is preset for the question "Did the agent use the standard company closing?" when the evaluation operation interface page is sent to the evaluator. These answers are pre populated based on the ML answers determined for the questions by ML model 224. It can be noted, however, the evaluator may choose a different answer than the ML answer. For example, the evaluator in FIG. 5B has changed the answer to question 508b from "no" to "yes".

The evaluation record 228 for the transaction can thus include the ML answers to the questions that were answered using ML model 224 and an indication of whether the human evaluator accepted or rejected the ML answer. FIG.

6 is a diagrammatic representation of one embodiment of an evaluation data 600 that can be included in one embodiment of an evaluation report. The evaluation report includes evaluation metadata, such as an evaluation identifier, a reference to the interaction evaluated, the channel evaluated, and the evaluation form used for the evaluation. In the illustrated embodiment, the evaluation data 600 includes the evaluation questions, the corresponding ML answer provided for each evaluation question that was answered using ML model 224, the answer quality score for the ML answer, the evaluator answer selected by the human evaluator and the evaluator answer quality score. The evaluation data 600 in the illustrated embodiment also includes an indication of whether the evaluator changed the evaluation answer from the ML answer. Using the example illustrated in FIG. 5A and FIG. 5B, the evaluation data 600 indicates that the human evaluator changed the evaluation answer to the question "Did the agent offer additional products and services?" from "no" to "yes." Analytics can be run on the evaluation reports to score agents based on question weights and answer quality scores.

Figure 7:
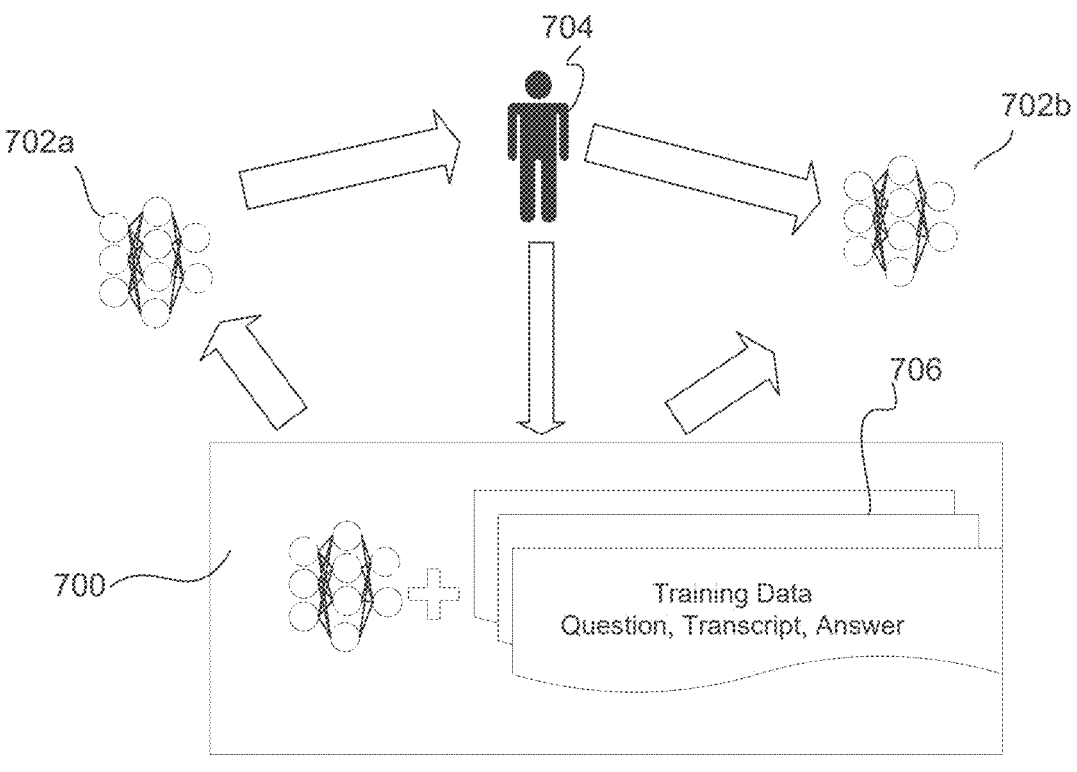
FIG. 7 is a diagrammatic representation of one embodiment of model lifecycle management.

FIG. 7 is a diagrammatic representation of one embodiment model lifecycle management. A model lifecycle management system 700 can be used to manage the life cycles of machine learning models used by evaluation systems (e.g., machine learning model 139, machine learning model 224). According to one embodiment, an initial machine learning model is trained for an answer type or acceptable answer set defined in an answer template. For example, a machine learning model can be trained to answer yes/no questions. As an even more particular example, an initial version of a yes/no model is created by training a Bidirectional Encoder Representations from Transformers (BERT) model, a Robustly Optimized BERT Pre-training Approach (ROBERTA), or a DistilBert model trained on a dataset of yes/no questions, such as the BoolQ dataset of naturally occurring questions. HITL evaluations are used to retrain the model. The first version 702a of the model is deployed for use.

Figure 6:
FIG. 6 is a diagrammatic representation of one embodiment of evaluation report data.

The model can be retrained using new training data 706 derived from the evaluations by human evaluators 704 or other training data. Training data 706 can include, for example, a question associated with a type of answer for which the model is trained (for example, a "yes/no" answer), a transcript evaluated using the question, and the evaluation answer to the question for the transcript (e.g., the answer determined by the human evaluator). Using the example of FIG. 5A, FIG. 5B, and FIG. 6, since machine learning model 224 gave the incorrect answer to "Did the agent offer additional products and services?" for the transcript text, it may be beneficial to retrain the model with the question "Did the agent offer additional products and services?", the transcript 505, and the answer "Yes". The model can be retrained and a new version 702b of the model deployed.

Figure 8:
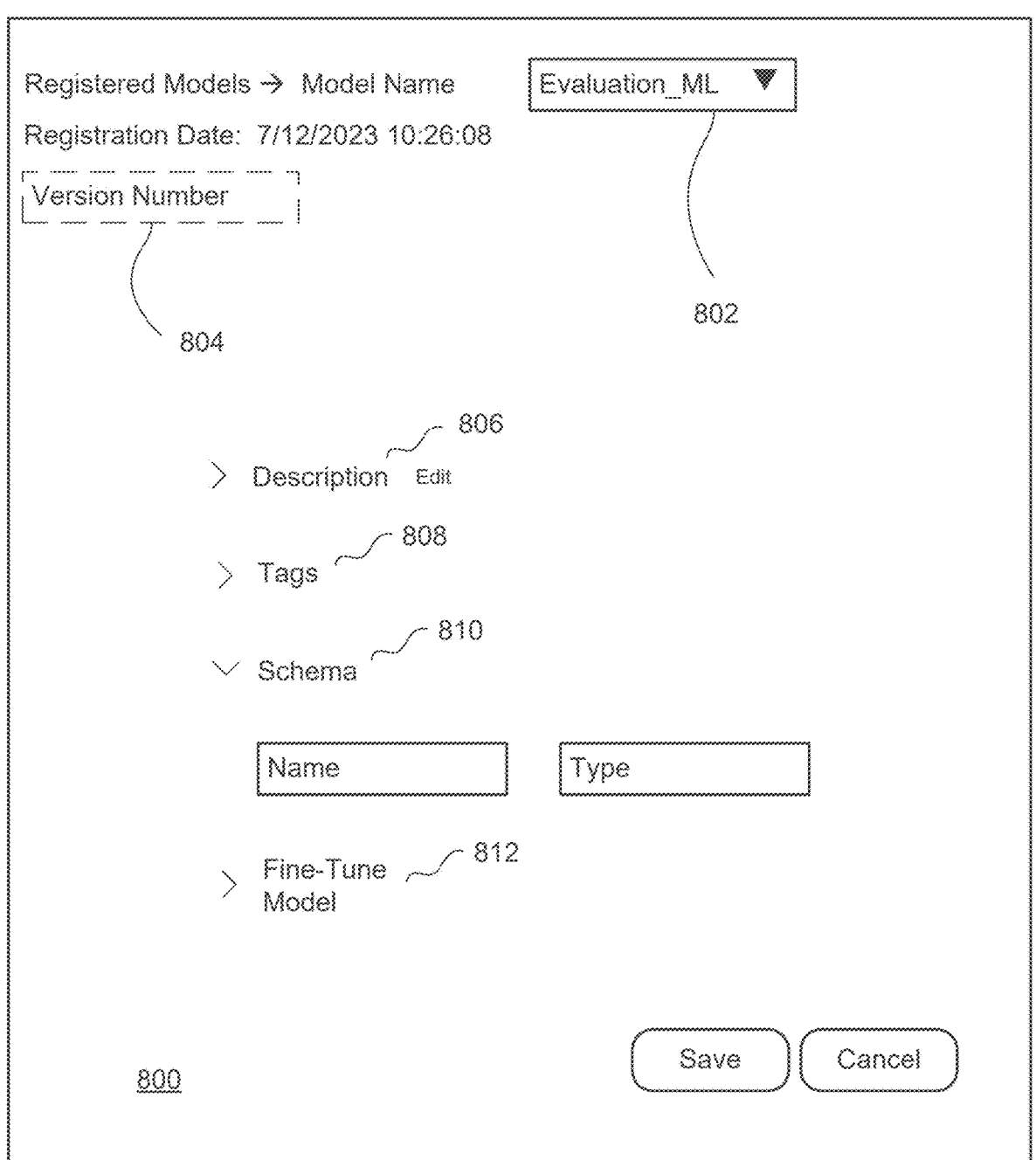
FIG. 8 is a diagrammatic representation of one embodiment of a configuration page for a machine-learning model.

FIG. 8 is a diagrammatic representation of a ML configuration page 800. The ML configuration page 800 comprises controls to allow a designer to edit, select or tune the ML model 139, 224. Model selection control 802 allows a user to select an ML model to edit. Model selection control 802 is shown as a list box, but could be implemented as a text box or any other type of control that allows selection of a machine learning model. Version number 804 is presented. As a user modifies the machine learning model selected by control 802, the version number of the respective ML model is changed or incremented. By having version numbers associated with an ML model, the ML models are uniquely identifiable.

The name or description 806 of the respective ML Model can be modified by an operator interacting with the ML configuration page. Further, tags 808 can be associated with the ML model selected via model selection control 802, to facilitate searching of the ML model. In one embodiment, tags 808 comprise metadata that describes aspects of the ML model under evaluation.

The schema 810 of the ML model can also be modified. The schema 810 describes the structure of the ML model. The schema 810 describes the input and output data type and format. The architecture of the ML model is also described by schema 810. Fine-Tune model control 812 exposes options to allow training data to be used to update the model. In one embodiment, the designer operator interface page 800 comprises a plurality of controls to changes to the ML model denoted by model selection control 802 or discard changes to the ML model specified by model selection control 802. When the ML Model is saved, the ML model may be as ML model data 245 in data store 206.

Figure 9:
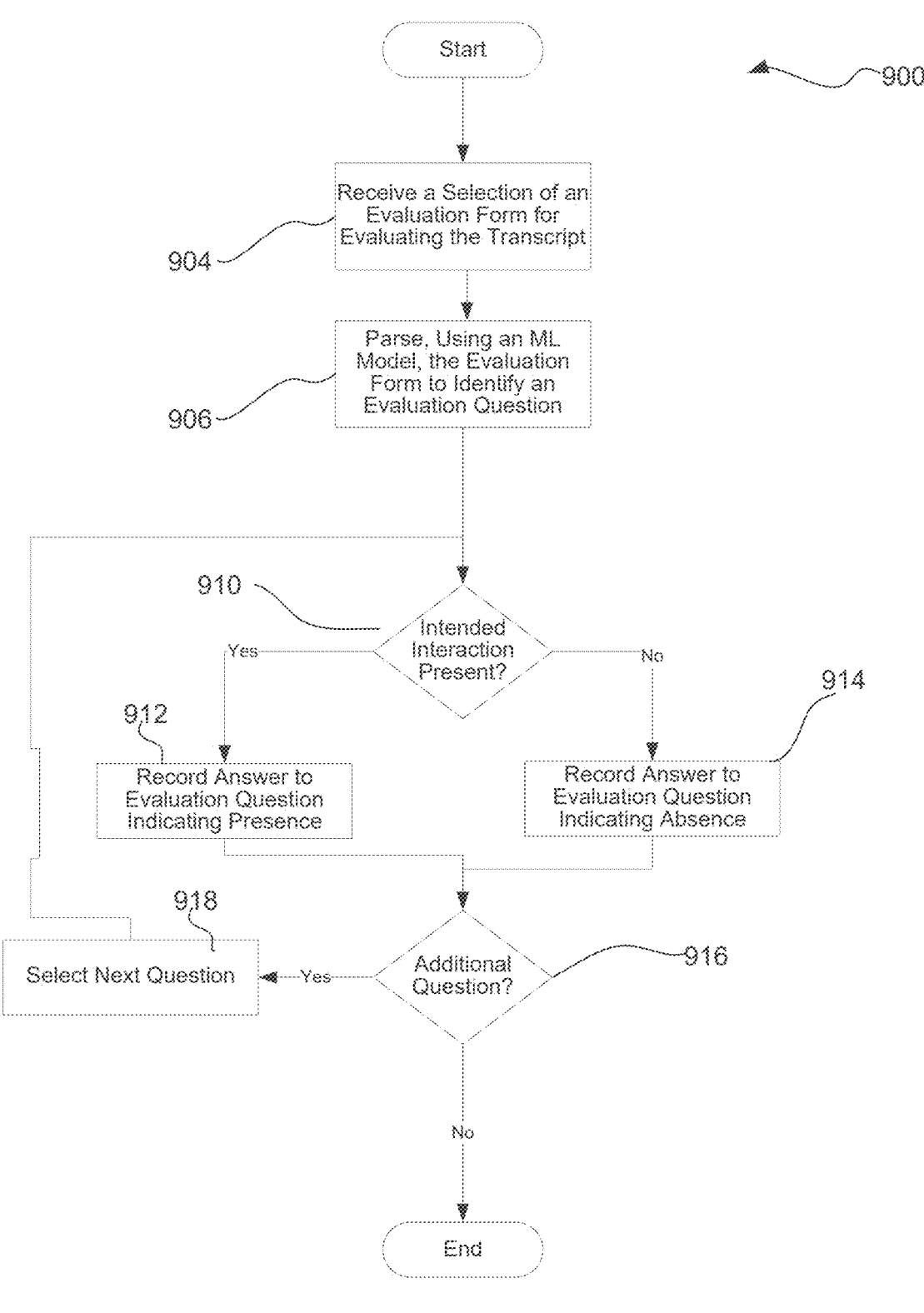
FIG. 9 is a flowchart illustrating an embodiment of a method for artificial intelligence-based evaluation of a caller interaction.

FIG. 9 is a flow chart illustrating one embodiment of a method 900 for generating an evaluation report based on an interaction. The steps of FIG. 9 may be implemented by a processor of an evaluation system (e.g., evaluation system 200) that executes instructions stored on a computer readable medium. The processor may be coupled to a data store, such as data store 118, data store 140, data store 208 or data store 206.

At step 904, a selection of an evaluation form for evaluating the transcript is received. At step 906, the evaluation form is parsed to identify an evaluation question.

At 908, a determination is made as to whether an intended call interaction is present in the transcript. Determining whether an intended call interaction is present in the transcript can be performed using a machine learning model. In some embodiments, the machine learning model is integrated as part of a HITL process. At step 910, the result of the determination is evaluated; if the result of the determination is affirmative or yes as indicated by 912 (e.g. the intended call interaction is present in the transcript), an answer to the evaluation question is recorded to indicate the presence of the intended call interaction. The answer can be recorded and associated with the evaluation form. If the result of the determination is no, as indicated by 914 (e.g. the intended call interaction is not present in the transcript), an answer to evaluation question is recorded to indicate the absence of the intended call interaction. The answer can be recorded and associated with the evaluation form. At step 916, it is determined if there is an additional question in the evaluation form. If there is an additional question, the next question is selected at step 918, and control returns to step 910.

FIG. 9 is merely illustrative and the disclosed subject matter is not limited to the ordering or number of steps illustrated. Embodiments may implement additional steps or alternative steps, omit steps, or repeat steps. Various steps may be repeated. For example, steps may be repeated for each question in the evaluation form.

Figure 10:
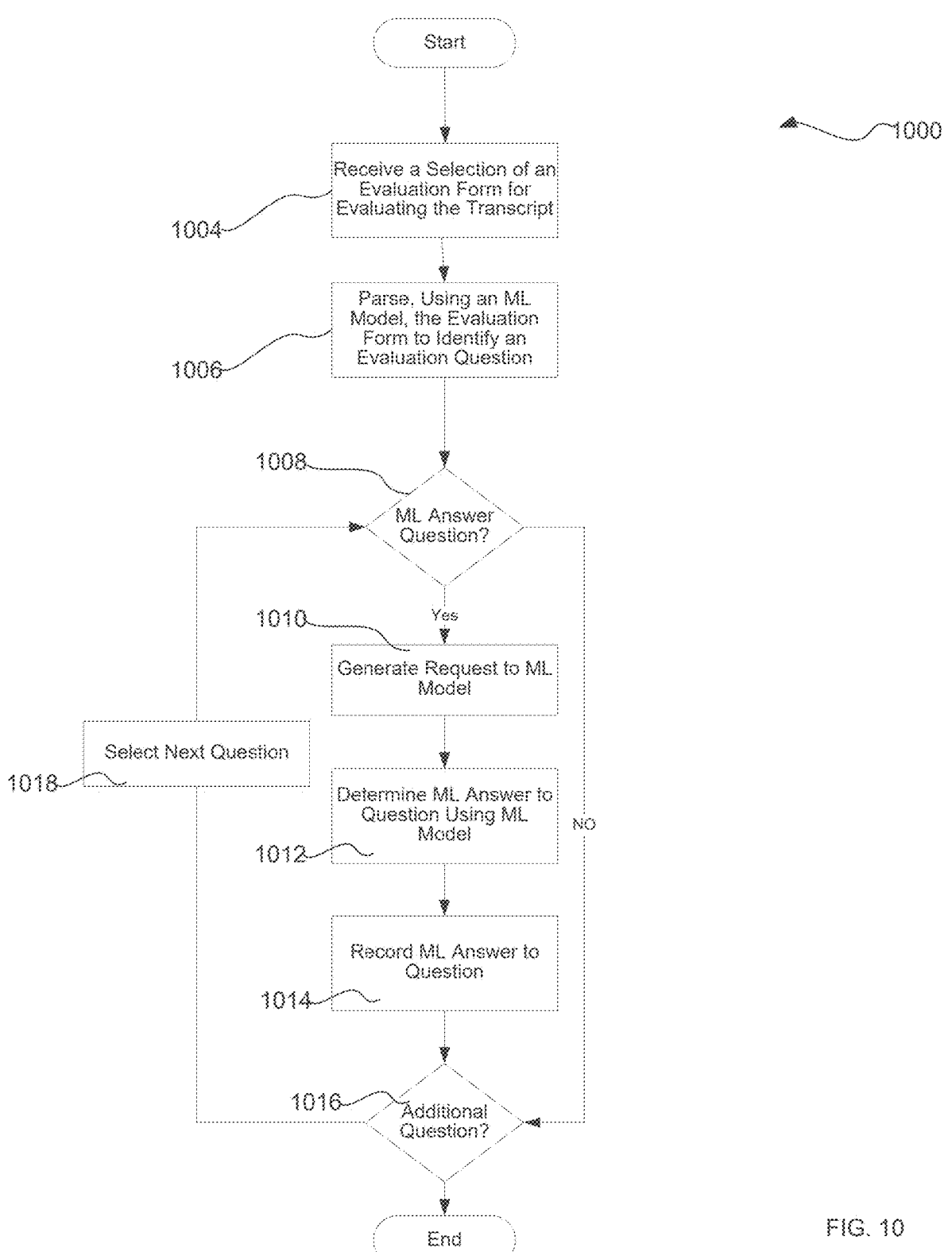
FIG. 10 is a flowchart illustrating an embodiment of a method for artificial intelligence-based evaluation of a caller interaction.

FIG. 10 is a flow chart illustrating one embodiment of a method 1000 for generating an evaluation report based on an interaction. The steps of FIG. 10 may be implemented by a processor of an evaluation system (e.g., evaluation system 200) that executes instructions stored on a computer readable medium. The processor may be coupled to a data store, such as data store 118, data store 140, data store 208 or data store 206.

At step 1004, a selection of an evaluation form for evaluating the transcript is received. At step 1006, the evaluation form is parsed to identify an evaluation question. At step 1008, the evaluation system determines if the question is selected for ML auto answering. If the question is selected for ML auto answering, the evaluation system, at step 1010 generates a request to a machine learning model trained to answer the type of question. In one embodiment, the request includes a prompt and context, where the prompt includes the question text or other prompt text designated for the question and the context includes transcript text.

At step 1012, the machine learning model processes the request and returns an ML answer to the question. The evaluation system stores the ML answer for the question in an evaluation report for the interaction being evaluated (step 1014). The answer to the question, according to one embodiment, can indicate the presence of an intended interaction in the transcript.

At step 1016, the evaluation system determines if there is another question in the evaluation form. If so, the evaluation system selects the next question in the evaluation form (step 1018) and returns to step 1008.

FIG. 10 is merely illustrative and the disclosed subject matter is not limited to the ordering or number of steps illustrated. Embodiments may implement additional steps or alternative steps, omit steps, or repeat steps. Various steps may be repeated. For example, steps may be repeated for each question in the evaluation form.

Figure 11:
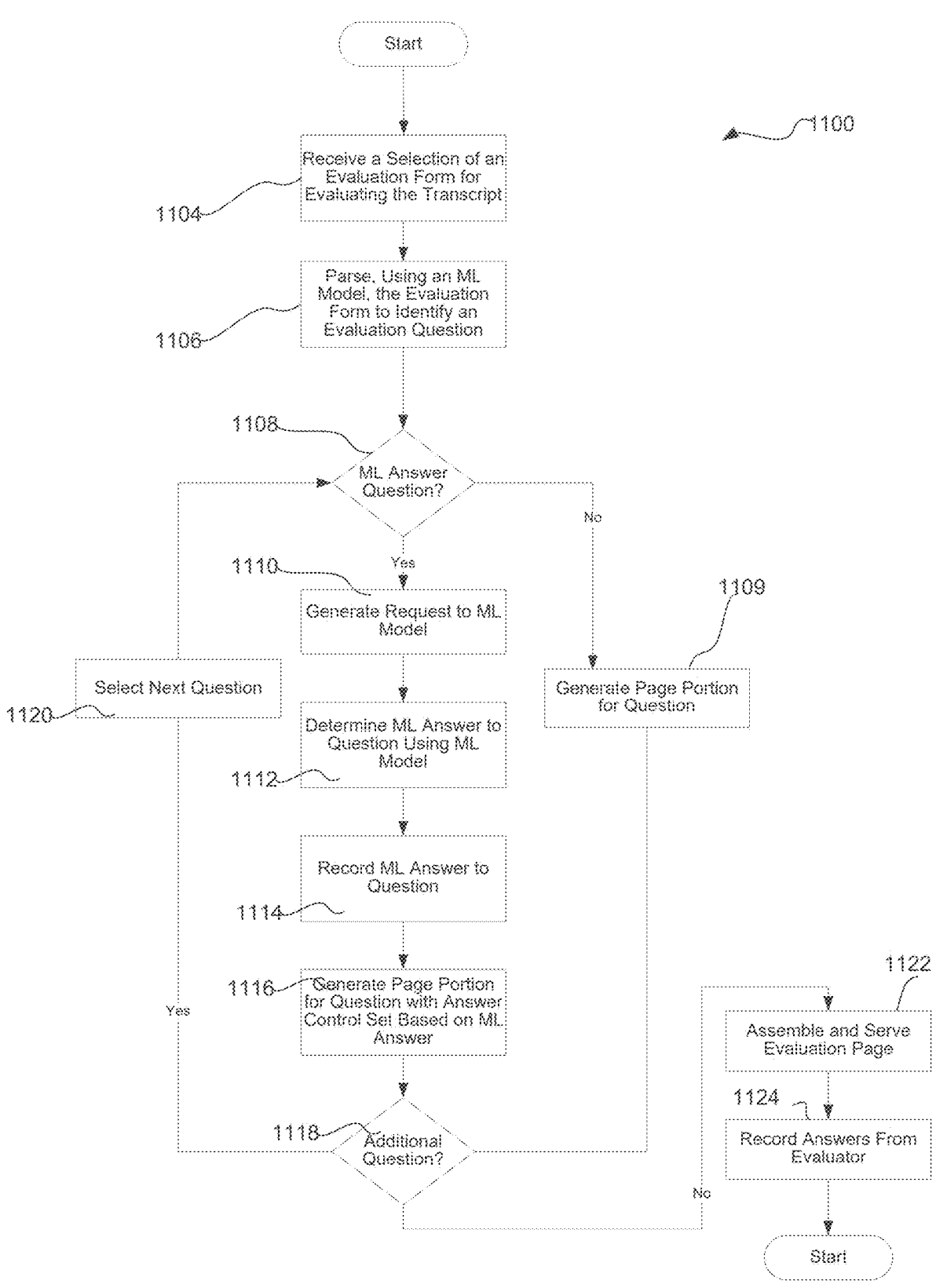
FIG. 11 is a flowchart illustrating another embodiment of a method for artificial intelligence-based evaluation of a caller interaction.

FIG. 11 is a flow chart illustrating one embodiment of a method 1100 for generating an evaluation report based on an interaction. The steps of FIG. 11 may be implemented by a processor of an evaluation system (e.g., evaluation system 200) that executes instructions stored on a computer readable medium. The processor may be coupled to a data store, such as data store 118, data store 140, data store 208 or data store 206.

At step 1104, a selection of an evaluation form for evaluating the transcript is received. At step 1106, the evaluation form is parsed to identify an evaluation question. At step 1108, the evaluation system determines if the question is selected for ML auto answering. If the question is not selected for ML auto answering, the evaluation system, at step 1109, generates the page code for the question where the page code includes the question text and answer controls (e.g., drop down list, edit box or multi-select controls with corresponding acceptable answers) to allow the evaluator to submit an answer (step 1122). If the question is selected for ML auto answering, the evaluation system, at step 1110, generates a request to a machine learning model trained to answer the type of question. In one embodiment, the request includes a prompt and context, where the prompt includes the question text or other prompt text designated for the question and the context includes transcript text.

At step 1112, the machine learning model processes the request and returns an ML answer to the question. The evaluation system stores the ML answer for the question in an evaluation report for the interaction being evaluated (step 1114). The answer to the question, according to one embodiment, can indicate the presence of an intended interaction in the transcript.

At step 1116, the evaluation system generates the page code for the question where the page code includes the question text and answer controls (e.g., drop down list, edit box or multi-select controls and corresponding answers) to allow the evaluator to submit an answer. In this case, the evaluation system presets the answer controls in the page code for the question to the ML answer (the answer determined for the question by the ML model at step 1112) (e.g., sets a radio button to "checked", sets a selected list option value for a dropdown list as selected or otherwise sets the answer control to indicate the preselected answer). Using the example of FIG. 5A, because the ML answer to the question "Did the agent use the standard company greeting?" was yes (FIG. 4B), the evaluation system presets the answer controls 510*a* in page 500 for question 508*a* to "yes."

At step 1118, the evaluation system determines if there is another question in the evaluation form. If so, the evaluation system selects the next question (step 1120) in the evaluation form and returns to step 1108.

The evaluation system assembles the evaluation page and serves the evaluation to the evaluator (e.g., for display in operator interface 212) (step 1122). The answers entered by the evaluator can be received by the evaluation system and recorded in the evaluation record (e.g., in data store 118, 218) (step 1124).

FIG. 11 is merely illustrative and the disclosed subject matter is not limited to the ordering or number of steps illustrated. Embodiments may implement additional steps or alternative steps, omit steps, or repeat steps. Various steps may be repeated. For example, steps may be repeated for each question in the evaluation form.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non limiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A system for artificial intelligence-based evaluation of an agent interaction, comprising:
  a processor;
  a data store storing a voice session recording of a call and an evaluation form;
  a visual display for displaying the evaluation form, wherein the evaluation form comprises an evaluation question and an answer control settable to indicate an answer to the evaluation question;
  a non-transitory computer readable medium storing instructions executable by the processor to:
    generate, using a speech-to-text transcription server, a transcript of the voice session recording of the call;
    parse the evaluation form to identify the evaluation question for an intended call participant interaction;
    automatically determine, using a large language model, whether the intended call participant interaction of the evaluation question is present in the transcript, wherein automatically determining whether the intended call participate interaction is present in the transcript comprises:
      generating a prompt to the large language model to cause the large language model to evaluate text from the transcript to determine if the intended call participant interaction is present in the transcript and send the prompt with text from the transcript; and
      processing the prompt and text from the transcript with the large language model to determine whether the intended call participate interaction is present in the transcript; and
    when the intended call participant interaction is determined using the large language model to be present in the transcript:
      record a first answer determined using the large language model for the evaluation question corresponding to the voice session recording, the first answer indicating a presence of the intended call participant interaction in the voice session recording; and
      based on the first answer, automatically set the answer control to a first setting prior to serving the evaluation form for display in the visual display to cause the evaluation form when displayed in the visual display to indicate the presence of the intended call participant interaction in the voice session recording.

2. The system of claim 1, wherein the instructions are further executable by the processor to:
  when the intended call participant interaction is determined not to be present in the voice session recording:
  record a second answer determined by the large language model as the response to the evaluation question for the voice session recording, the second answer indicating the intended call participant interaction is not present in the call; and
  automatically set the answer control of the evaluation form to a second setting, the second setting indicating that the intended call participant interaction is not present in the voice session recording.

3. The system of claim 1, wherein the instructions are further executable by the processor to:
  receive a verification answer to the evaluation question;
  determine that the verification answer differs from the response to the evaluation question; and
  update the large language model with the evaluation question and the verification answer.

4. The system of claim 1, wherein the evaluation question is in a Boolean format.

5. A computer program product comprising a non-transitory computer readable medium storing instructions executable by a processor to:
  store a voice session recording of a call and an evaluation form;
  display, on a visual display, the evaluation form, wherein the evaluation form comprises an evaluation question and an answer control settable to indicate an answer to the evaluation question;
  generate, using a speech-to-text transcription server, a transcript of the voice session recording of the call;
  parse the evaluation form to identify the evaluation question for an intended call participant interaction;
    automatically determine, using a large language model, whether the intended call participant interaction of the evaluation question is present in the transcript, wherein automatically determining whether the intended call participate interaction is present in the transcript comprises:
      generating a prompt to the large language model to cause the large language model to evaluate text from the transcript to determine if the intended call participant interaction is present in the transcript and send the prompt with text from the transcript; and
      processing the prompt and text from the transcript with the large language model to determine whether the intended call participate interaction is present in the transcript; and
  when the intended call participant interaction is determined using the large language model to be present in the transcript:
    record a first answer determined using the large language model for the evaluation question corresponding to the voice session recording, the first answer indicating a presence of the intended call participant interaction in the voice session recording; and
    based on the first answer, automatically set the answer control to a first setting in the evaluation form prior to serving the evaluation form for display in the visual display to cause the evaluation form when displayed in the visual display to indicate the presence of the intended call participant interaction in the voice session recording.

6. The computer program product of claim 5, wherein the instructions are further executable by the processor to:

when the intended call participant interaction is determined using the large language model not be present in the voice session recording, automatically set the answer control for the evaluation question to a second setting to indicate that the intended call participant interaction is not present in the voice session recording.

7. The computer program product of claim 5, wherein the instructions are further executable by the processor to:

receive a verification answer to the evaluation question;

determine that the verification answer differs from the response to the evaluation question; and update the large language model with the evaluation question and the verification answer.

8. The computer program product of claim 5, wherein the evaluation question is in a Boolean format.

9. The computer program product of claim 5, wherein the answer control comprises a radio button.

10. A method for artificial intelligence-based evaluation of an agent interaction comprising:

storing a voice session recording of a call and an evaluation form, wherein the voice session recording comprises a plurality of call participant interactions recorded by a call center recording system;

displaying, on an evaluation operator interface, an evaluation question from the evaluation form and an answer control settable to indicate a response to the evaluation question;

generate, using a speech-to-text transcription server, a transcript of the voice session recording of the call;

parse the evaluation form to identify the evaluation question for an intended call participant interaction;

automatically determine, using a large language model, that the intended call participant interaction of the evaluation question is present in the transcript, wherein automatically determining that the intended call participate interaction is present in the transcript comprises:

generating a prompt to the large language model to cause the large language model to evaluate text from the transcript to determine if the intended call participant interaction is present in the transcript and send the prompt with text from the transcript; and processing the prompt and text from the transcript with the large language model to determine that the intended call participate interaction is present in the transcript; and when the intended call participant interaction is present in the transcript:

recording a first answer generated using large language model for the evaluation question corresponding to the voice session recording, the first answer indicating a presence of the intended call participant interaction in the voice session recording; and based on the first answer, automatically setting the answer control in the evaluation from to a first setting prior to serving the evaluation form for display in the visual display to cause the evaluation form when displayed in the visual display to indicate the presence of the intended call participant interaction in the voice session recording.

11. The method of claim 10, wherein the first answer is one of a plurality of selectable settings and indicates the presence of the intended call participant interaction in the voice session recording.

12. The method of claim 11, further comprising:

receiving a verification answer to the evaluation question;

determining that the verification answer differs from the response to the evaluation question; and updating the machine learning model with the evaluation question and the verification answer.

13. The method of claim 10, wherein the second answer is one of a plurality of selectable settings and indicates that the intended call participant interaction is not present in the voice session recording.

14. The method of claim 10, wherein the machine learning model is a large language model (LLM).

15. The method of claim 10, wherein submitting the voice session recording to the machine learning model comprises submitting a transcript of the call to the machine learning model.

16. The method of claim 11, wherein the evaluation question is in a Boolean format.

\* \* \* \* \*